United States Patent
Nakamura et al.

(10) Patent No.: US 11,306,460 B2
(45) Date of Patent: Apr. 19, 2022

(54) WORK MACHINE

(71) Applicant: Hitachi Construction Machinery Co., Ltd., Tokyo (JP)

(72) Inventors: Satoshi Nakamura, Hitachinaka (JP); Kunitsugu Tomita, Kashiwa (JP); Youhei Toriyama, Kashiwa (JP); Joonyoung Roh, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 208 days.

(21) Appl. No.: 16/649,430

(22) PCT Filed: Mar. 15, 2019

(86) PCT No.: PCT/JP2019/010944
§ 371 (c)(1),
(2) Date: Mar. 20, 2020

(87) PCT Pub. No.: WO2019/177162
PCT Pub. Date: Sep. 19, 2019

(65) Prior Publication Data
US 2020/0283992 A1 Sep. 10, 2020

(30) Foreign Application Priority Data

Mar. 15, 2018 (JP) .............................. JP2018-048648

(51) Int. Cl.
*E02F 9/20* (2006.01)
*E02F 3/32* (2006.01)
(Continued)

(52) U.S. Cl.
CPC .............. *E02F 9/2025* (2013.01); *E02F 3/32* (2013.01); *E02F 9/26* (2013.01); *G01G 19/10* (2013.01); *G07C 3/08* (2013.01)

(58) Field of Classification Search
CPC . E02F 3/32; E02F 3/435; E02F 9/2025; E02F 9/26; E02F 9/264; G01G 19/083; G01G 19/10; G07C 3/08; G07C 5/0825
See application file for complete search history.

(56) References Cited

U.S. PATENT DOCUMENTS

| 5,509,293 | A | 4/1996 | Karumanchi |
| 7,543,448 | B2 * | 6/2009 | Nakamura ............ F02D 41/021 60/434 |

(Continued)

FOREIGN PATENT DOCUMENTS

| EP | 1 445 386 A1 | 8/2004 |
| JP | 58-162816 A | 9/1983 |

(Continued)

OTHER PUBLICATIONS

International Preliminary Report on Patentability (PCT/IB/338 & PCT/IB/373) issued in PCT Application No. PCT/JP2019/010944 dated Sep. 24, 2020, including English translation of document C2 (Japanese-language Written Opinion (PCT/ISA/237) previously filed on Mar. 20, 2020) (six (6) pages).

(Continued)

*Primary Examiner* — Tyler J Lee
(74) *Attorney, Agent, or Firm* — Crowell & Moring LLP

(57) ABSTRACT

A controller 21 mounted on a work machine calculates a target carried load representing a target value for a carried load carried by the work machine on the basis of loadage of a transportation machine in case the loadage is changed, calculates a minimum integration load value depending on the magnitude of the calculated target carried load, and calculates the loadage by integrating the carried load in case it is determined that a work implement has performed a loading operation on the transportation machine and in case (Continued)

the calculated carried load is equal to or larger than the minimum integration load value.

8 Claims, 22 Drawing Sheets

(51) Int. Cl.
*E02F 9/26* (2006.01)
*G01G 19/10* (2006.01)
*G07C 3/08* (2006.01)

(56) References Cited

U.S. PATENT DOCUMENTS

| | | | |
|---|---|---|---|
| 9,739,038 B2* | 8/2017 | Baba | E02F 9/262 |
| 10,508,410 B2* | 12/2019 | Hoshaku | E02F 3/437 |
| 2007/0260380 A1 | 11/2007 | Mintah et al. | |
| 2014/0107897 A1* | 4/2014 | Zhu | E02F 9/2025 |
| | | | 701/50 |
| 2015/0292178 A1 | 10/2015 | Nagato et al. | |

FOREIGN PATENT DOCUMENTS

| | | | |
|---|---|---|---|
| JP | 2000-129727 | A | 5/2000 |
| JP | 4017144 | B2 | 12/2007 |
| JP | 2009-236752 | A | 10/2009 |
| JP | 2010-89633 | A | 4/2010 |
| JP | 5138438 | B2 | 2/2013 |
| JP | 2014-101695 | A | 6/2014 |

OTHER PUBLICATIONS

Korean-language Office Action issued in Korean Application No. 10-2020-7006305 dated Sep. 24, 2021 (five (5) pages).
International Search Report (PCT/ISA/210) issued in PCT Application No. PCT/JP2019/010944 dated May 7, 2019 with English translation (five pages).
Japanese-language Written Opinion (PCT/ISA/237) issued in PCT Application No. PCT/JP2019/010944 dated May 7, 2019 (four pages).
Extended European Search Report issued in European Application No. 19767563.0 dated Nov. 9, 2021 (seven (7) pages).

* cited by examiner

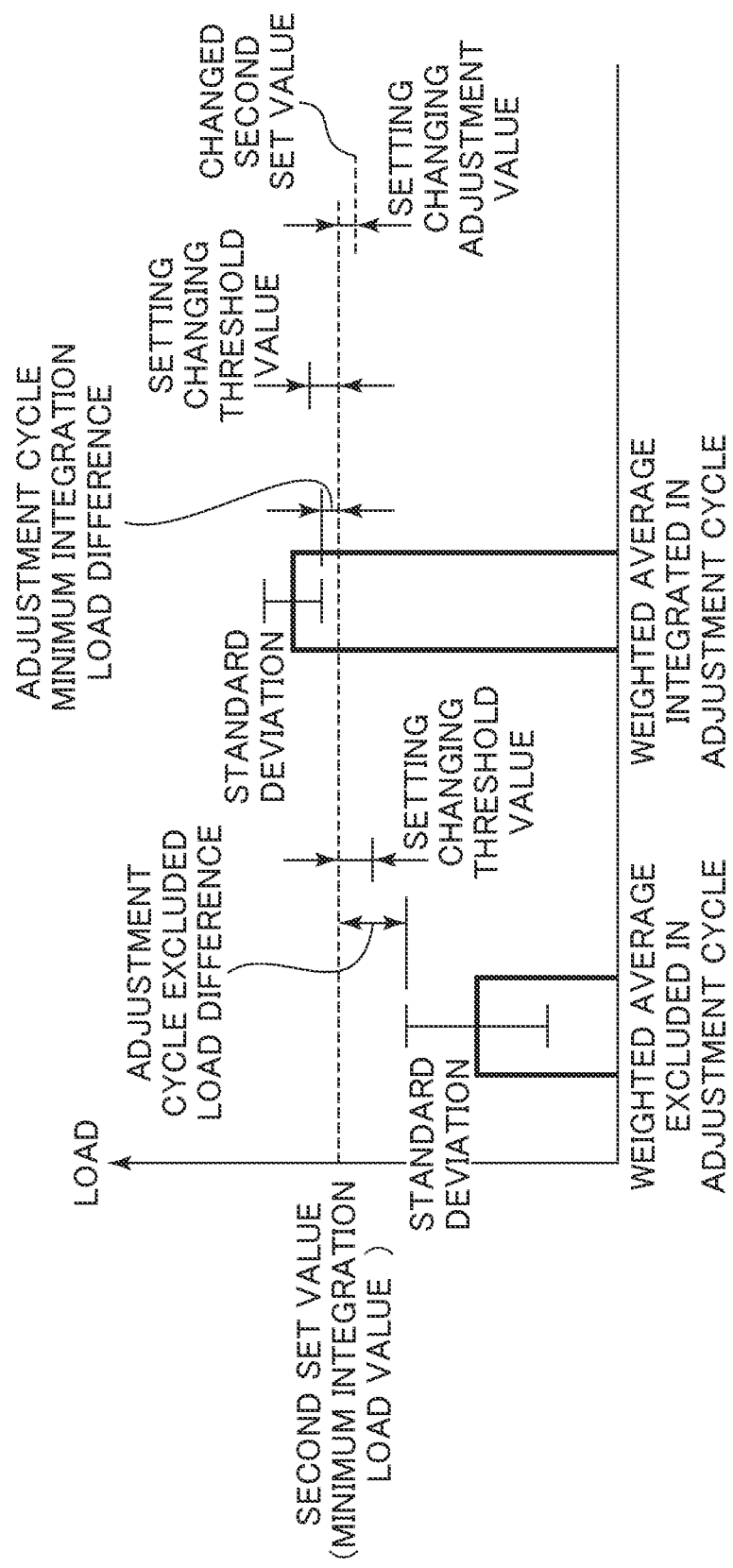

WORK MACHINE

TECHNICAL FIELD

The present invention relates to a work machine having a controller for calculating the load value of carried stuff that is carried to a transportation machine by a work implement.

BACKGROUND ART

Generally, work machines represented by hydraulic excavators perform a work (a loading work) for loading a transportation machine such as a dump truck with excavated stuff (which may be referred to as "carried stuff") loading the cargo bed of a dump truck with minerals excavated from a mine.

In the loading work, if the amount of stuff to be loaded from a work machine to a transportation machine (the total weight of carried stuff on the transportation machine, also referred to as "loadage of the transportation machine") can be optimized, then a reduction in the production output due to a loading shortage and an unnecessary reloading work owing to overloading can be eliminated, resulting in an increase in the productivity at site.

As a means for optimizing an amount of stuff to be loaded on a transportation machine, there is known a work machine that measures the load of excavated stuff (carried stuff) while the work machine is transporting the excavated stuff, integrates measured loads to calculate loadage of the transportation machine (an amount of stuff to be loaded on the transportation machine), and presents the load value of the excavated stuff and the loadage of the transportation machine to the operator of the work machine. Since presenting the loadage of the transportation machine allows the operator to adjust amounts of stuff to be excavated in next and subsequent cycles, the loadage of the transportation machine can be optimized. Furthermore, the operator, to whom the loadage of the transportation machine and the load value of the excavated stuff have been presented, is able to determine whether the transportation machine will be overloaded when loaded with excavated stuff being carried or not, and hence to prevent overloading in advance.

A loading work carried out by a work machine includes a loading operation to load a transportation machine with carried stuff. A loading capacity measuring apparatus for a wheel loader disclosed in Patent Document 1 measures the load of carried stuff (the load of a bucket) during a predetermined period in which the boom is lifted. When one of the condition (1) in which the boom angle falls in a preset angular range during the predetermined period, the condition (2) in which the bucket angle falls in a preset angular range during the predetermined period, and the condition (3) in which no load is sensed in periods each positioned before and after the predetermined period is satisfied, the loading capacity measuring apparatus determines that a loading operation has been carried out and integrates loads of the carried stuff. On the other hand, if these conditions are not satisfied, then the loading capacity measuring apparatus determines that a similar operation different from the loading operation has been carried out, and does not integrates loads of the carried stuff.

PRIOR ART DOCUMENTS

Patent Documents

Patent Document 1: JP-2009-236752-A

SUMMARY OF THE INVENTION

Problems to be Solved by the Invention

A work machine may perform a work in which an operation identical or similar to an operation in a loading work is carried out, but no carried stuff is loaded onto a transportation machine (such a work will hereinafter be referred to as "operation-analogous non-loading work"). For example, a work machine performs, as a work of the type described, a work (a cleaning work) between loading works, in which after having finished a loading work on a transportation machine, the work machine moves away obstructive gravel in order to secure an entry path and a stopping position for another transportation machine to arrive next. In the cleaning work, the work machine carries out an operation (a bucket dumping operation for discharging gravel into a place where transportation machines will not be obstructed) similar to an operation for loading carried stuff onto a transportation machine in a loading work (a bucket dumping operation for loading carried stuff onto the cargo bed of the transportation machine). Since no carried stuff is loaded onto a transportation machine in such a similar operation, the similar operation should be distinguished from a loading operation in a loading work.

The loading capacity measuring apparatus disclosed in Patent Document 1 senses a loading operation and performs an integration depending on whether the boom angle and the bucket angle during the predetermined period while the boom is being raised, i.e., while the load of the carried stuff is being measured, fall in the respective preset angular ranges or not. In the above cleaning work, since boom raising and bucket dumping that are similar to those in an operation for loading the transportation machine can be carried out, a loading operation may be determined as being performed in the cleaning work according to the determining process based on the boom angle and the bucket angle as disclosed in Patent Document 1. Consequently, an erroneous integration may be carried out, and the calculated value of loadage of the transportation machine may deviate from an actual value and have its own accuracy lowered. In addition, according to Patent Document 1, even if no load is sensed in the periods each positioned before and after the measurement of the load of the carried stuff (the predetermined period while the boom is being raised), a loading operation is determined as being performed and an integration is carried out. In case an operation in a cleaning work satisfies this condition, loads of obstructive gravel that should not be loaded onto the transportation machine are integrated, possibly reducing the accuracy of the calculated value of loadage.

It is an object of the present invention to provide a work machine that is capable of accurately distinguishing a work in which an operation similar to a loading operation is carried out, but no carried stuff is loaded onto a transportation machine (an operation-analogous non-loading work) and a loading work from each other.

Means for Solving the Problems

The present application includes a plurality of means for solving the above problems. According to an example, there is provided a work machine including a work implement, an actuator for actuating the work implement, a controller for determining an operation of the work implement on a basis of at least one of posture information of the work implement and load information of the actuator, calculating a carried load representing a load value of carried stuff carried by the work implement in case it is determined that the work implement has performed a carrying operation for a transportation machine, and integrating the carried load to calculate loadage of the transportation machine, and a display device for displaying the loadage. In the work machine, the controller calculates a target carried load representing a target value for the carried load per bucket to be carried in a next carrying operation in case the loadage is changed, on a basis of the loadage, calculates a minimum integration load value for determining that the work implement has performed a loading operation depending on magnitude of the target carried load, and calculates the loadage by integrating the carried load in case it is determined that the work implement has performed a loading operation on the transportation machine on a basis of a posture of the work implement and in case the carried load is equal to or larger than the minimum integration load value.

Advantages of the Invention

According to the present invention, since a loading operation in a loading work and a similar operation that is different therefrom are distinguished accurately from each other, the accuracy of a calculated value of loadage of the transportation machine is increased.

BRIEF DESCRIPTION OF THE DRAWINGS

FIG. 22 is a graph illustrating the method in which the load measuring system according to the different embodiment of the present invention changes the settings about changing the magnitude of the minimum integration load value.

MODES FOR CARRYING OUT THE INVENTION

Embodiments of the present invention will hereinafter be described below with reference to the drawings. In cases to be described below, a hydraulic excavator is used as a loading machine incorporating a load measuring system of a work machine, and a dump truck is used as a transportation machine.

The work machine (the loading machine) addressed by the present invention is not limited to a hydraulic excavator having a bucket as an attachment, but also includes a hydraulic excavator having an attachment capable of holding and releasing carried stuff, such as a grapple, a lifting magnet, or the like. The present invention is also applicable to a wheel loader or the like including a work arm, which is free of a swinging function such as of a hydraulic excavator.

First Embodiment

—Overall Arrangement—

Figure 1:
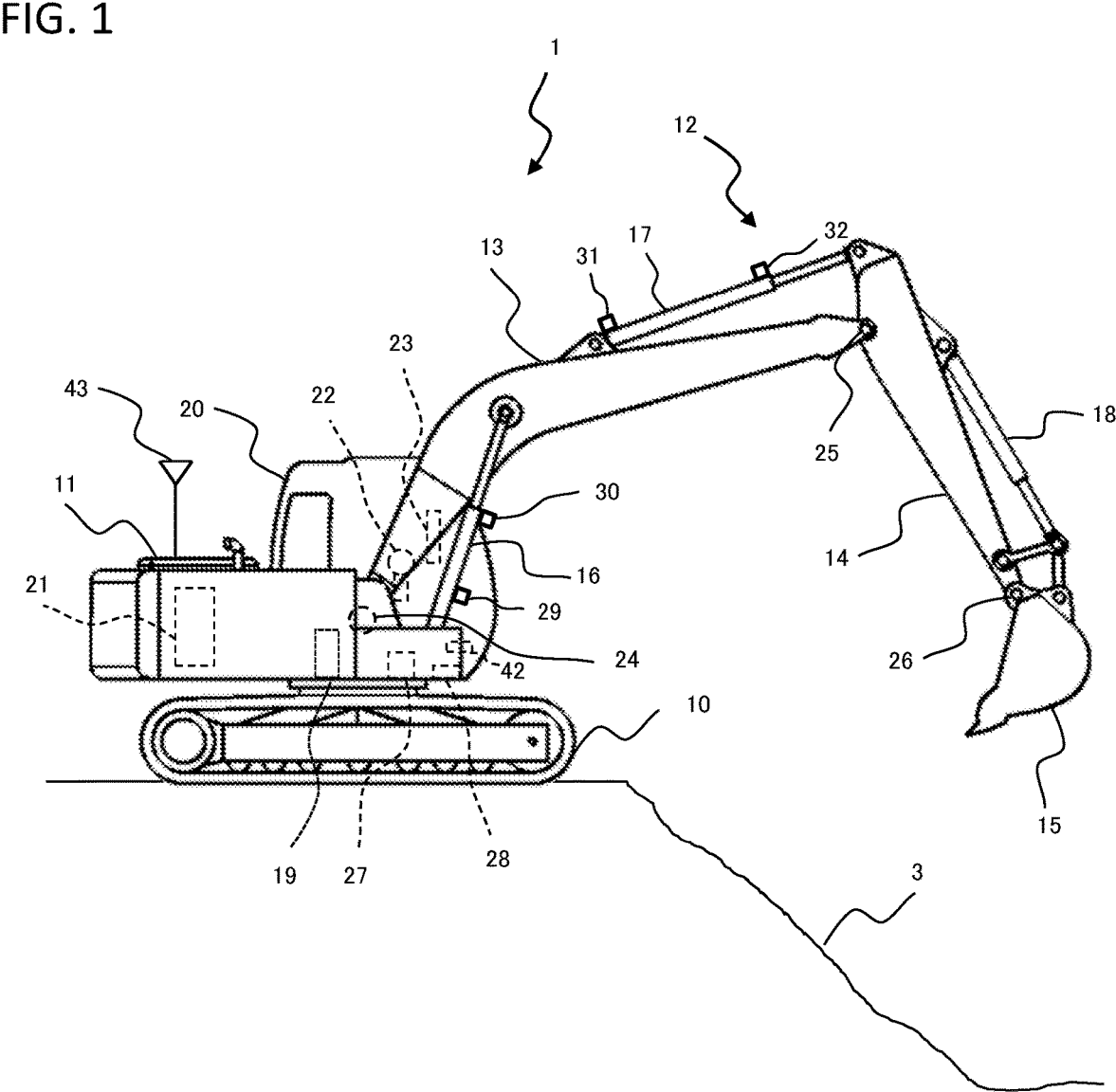
FIG. 1 is a side elevational view illustrating a configurational example of a hydraulic excavator according to an embodiment of the present invention.

FIG. 1 is a side elevational view of a hydraulic excavator according to the present embodiment. The hydraulic excavator, denoted by 1 in FIG. 1, includes a lower track structure 10, an upper swing structure 11 swingably mounted on an upper portion of the lower track structure 10, a front work implement 12 mounted as a multijoint work arm on a front portion of the upper swing structure 11, a turn motor 19 as a hydraulic motor for turning the upper swing structure 11, an operation room (cabin) 20 mounted on the upper swing structure 11 and occupied by an operator for operating the hydraulic excavator 1, control levers (control devices) 22 (22a, 22b) disposed in the operation room 20 for controlling operation of actuators mounted on the hydraulic excavator 1, and a controller 21 for controlling operation of the hydraulic excavator 1, the controller 21 having memories (a ROM and a RAM, for example) a processing device (a CPU, for example) and input and output devices.

The front work implement 12 includes a boom 13 angularly movably mounted on the upper swing structure 11, an arm 14 angularly movably mounted on a distal end of the boom 13, and a bucket (attachment) 15 angularly movably mounted on a distal end of the arm 14. The front work implement 12 also includes, as actuators for actuating the front work implement 12, a boom cylinder 16 that is a hydraulic cylinder for actuating the boom 13, an arm cylinder 17 that is a hydraulic cylinder for actuating the arm 14, and a bucket cylinder 18 that is a hydraulic cylinder for actuating the bucket 15.

The boom 13, the arm 14, and the bucket 15 are angularly movable about respective shafts that are combined with a boom angle sensor 24, an arm angle sensor 25, and a bucket angle sensor 26, respectively. These angle sensors 24, 25, and 26 can acquire respective angles through which the boom 13, the arm 14, and the bucket 15 are angularly moved. A swinging angular velocity sensor (gyroscope) 27 and an inclination angle sensor 28 are mounted on the upper swing structure 11 for acquiring a swinging angular velocity of the upper swing structure 11 and an inclination angle in forward and rearward directions of the upper swing structure 11, respectively. Posture information that specifies a posture of the front work implement 12 can be acquired from sensed values from the angle sensors 24, 25, 26, 27, and 28.

A boom bottom pressure sensor 29 and a boom rod pressure sensor 30, and an arm bottom pressure sensor 31 and an arm rod pressure sensor 32 are attached respectively to the boom cylinder 16 and the arm cylinder 17, for acquiring pressures in the respective hydraulic cylinders. Drive force information that specifies thrust forces of the cylinders 16 and 18, i.e., drive forces applied to the front work implement 12, and load information that specifies loads on the cylinders 16 and 18 are acquired from sensed values from the pressure sensors 29, 30, 31, and 32. Similar pressure sensors may be mounted on the bottom and rod sides of the bucket cylinder 18 for acquiring drive force information and load information of the bucket cylinder 18 for use in various control processes.

The boom angle sensor 24, the arm angle sensor 25, the bucket angle sensor 26, the inclination angle sensor 28, and the swinging angular velocity sensor 27 may be replaced with other sensors insofar as they can sense physical quantities from which posture information of the front work implement 12 can be calculated. For example, the boom angle sensor 24, the arm angle sensor 25, and the bucket angle sensor 26 may be replaced with inclination angle sensors or inertia measurement units (IMUs). The boom bottom pressure sensor 29, the boom rod pressure sensor 30, the arm bottom pressure sensor 31, and the arm rod pressure sensor 32 may be replaced with other sensors insofar as they can sense physical quantities from which thrust forces produced by the boom cylinder 16 and the arm cylinder 17, i.e., drive force information of the front work implement 12, and load information of the cylinders 16 and 17 can be sensed). Furthermore, instead of or in addition to the sensing of thrust forces, drive forces, and loads, operation speeds of the boom cylinder 16 and the arm cylinder 17 may be sensed by stroke sensors, and operation speeds of the boom 13 and the arm 14 may be sensed by IMUs for sensing operation of the front work implement 12.

The operation room 20 houses therein a monitor (display device) 23 for displaying calculated results from the controller 21 (a carried load representing a load value of carried stuff 4 in the bucket 15, calculated by a load calculating section 51, and loadage of a transportation machine representing an integrated value of carried loads) and the like, control levers 22 (22a, 22b) for indicating operation of the front work implement 12 and the upper swing structure 11, and a loadage reset instruction unit 42 for outputting to the controller 21 a signal indicating the resetting of loadage of the transportation machine that represents an integrated value of carried loads (an integration reset instruction signal). An external communication unit 43 (not illustrated) for allowing the controller 21 to communicate with an external computer or the like (a controller mounted on a dump truck 2 (see FIG. 4) as a transportation machine) is mounted on an upper surface of the upper swing structure 11. After a loading work on a certain dump truck 2 has been completed, the loadage reset instruction unit 42 is pressed by the operator of the hydraulic excavator 1 as part of a preparatory process for a loading work on a next dump truck 2.

The monitor 23 according to the present embodiment has a touch panel, so that it also functions as an input device for allowing the operator to enter information into the controller 21. The monitor 23 may be a liquid crystal display having a touch panel, for example. In that case, a reset switch may be provided as the loadage reset instruction unit 42 on the screen of the monitor 23, and when the reset switch is pressed, an integration reset instruction signal (reset signal) may be output to the controller 21.

The control lever 22a indicates raising and lowering of the boom 13 (extending and contracting of the boom cylinder 16) and dumping and crowding of the bucket 15 (extending and contracting of the bucket cylinder 18) whereas the control lever 22b indicates dumping and crowding of the arm 14 (extending and contracting of the arm cylinder 17) and leftward turning and rightward turning of the upper swing structure 11 (leftward rotation and rightward rotation of the hydraulic motor 19). The control lever 22a and the control lever 22b are dual composite multifunction control levers. Forward and rearward actions of the control lever 22a correspond respectively to raising and lowering of the boom 13, and leftward and rightward actions of the control lever 22a correspond respectively to dumping and crowding of the bucket 15. Forward and rearward actions of the control lever 22b correspond respectively to dumping and crowding of the arm 14, and leftward and rightward actions of the control lever 22b correspond respectively to leftward turning and rightward turning of the upper swing structure 11. When each of the levers is operated in an oblique direction, the corresponding two actuators are operated simultaneously. The operation amounts of the control levers 22a and 22b define operation speeds of the actuators 16 through 19.

Figure 2:
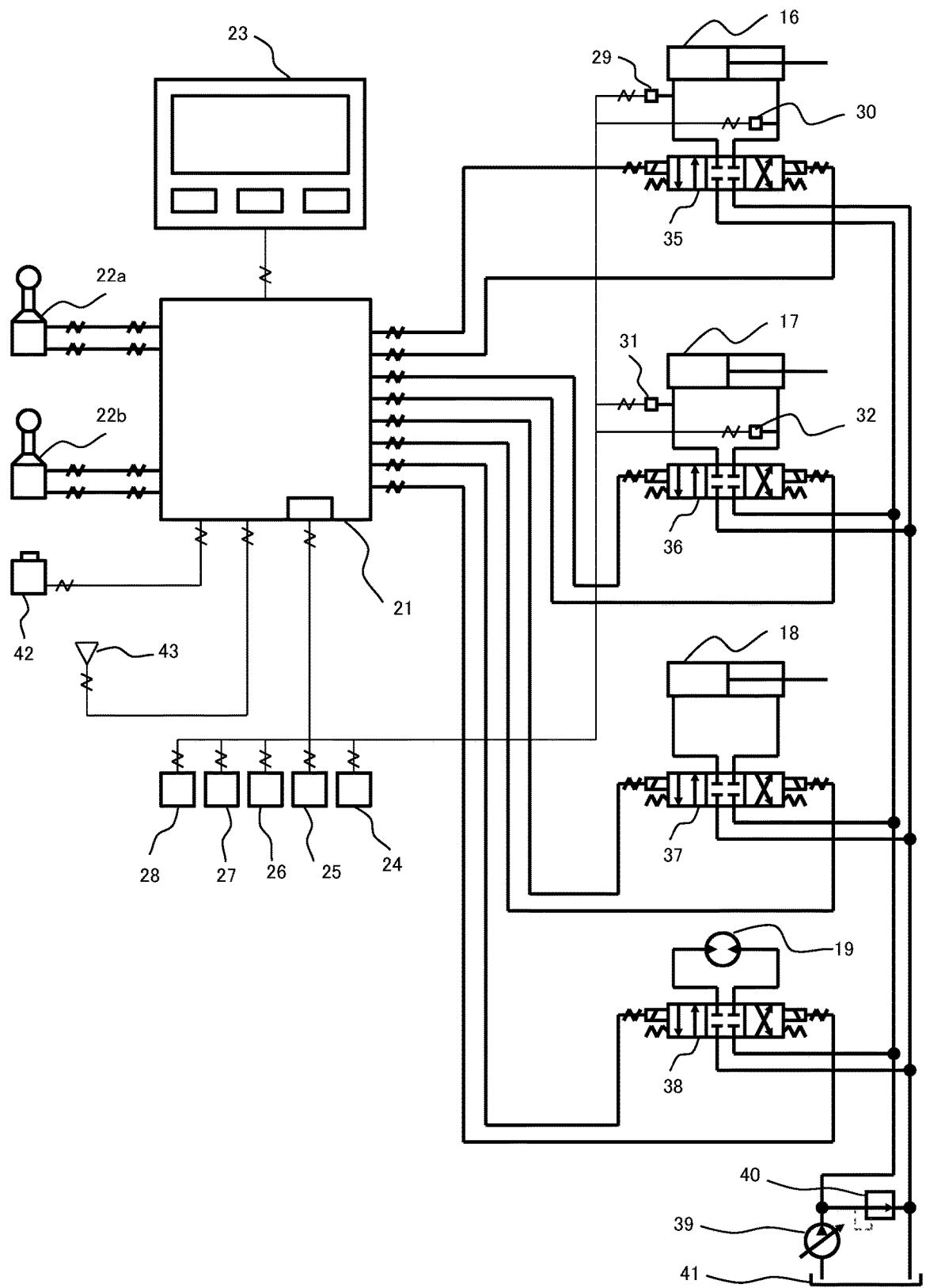
FIG. 2 is a hydraulic circuit diagram illustrating the configuration of a load measuring system according to the embodiment of the present invention.

FIG. 2 is a schematic diagram of a hydraulic circuit of the hydraulic excavator 1 according to the present embodiment. The boom cylinder 16, the arm cylinder 17, the bucket cylinder 18, and the turn motor 19 are driven by a hydraulic working fluid delivered from a main pump 39. The rates at which and the directions in which the hydraulic working fluid flows as it is supplied to the hydraulic actuators 16 through 19 are controlled by respective control valves 35, 36, 37, and 38 that are actuated by drive signals that are output from the controller 21 according to the operation directions in which and the operation amounts by which the control levers 22a and 22b are operated.

The control levers 22a and 22b generate control signals according to the operation directions in which and the operation amounts by which they are operated and outputs the generated control signals to the controller 21. The controller 21 generates drive signals (electric signals) according to the control signals, and outputs the generated drive signals to the control valves 35 through 38, which are electromagnetic proportional valves, thereby actuating the control valves 35 through 38.

The directions in which the control levers 22a and 22b are operated define the directions in which the hydraulic actuators 16 through 19 are operated. When the control lever 22a is operated in a forward direction, the spool of the control valve 35 that controls the boom cylinder 16 is moved to the left in FIG. 2, supplying the hydraulic working fluid to the bottom side of the boom cylinder 16. When the control lever 22a is operated in a rearward direction, the spool of the control valve 35 is moved to the right in FIG. 2, supplying the hydraulic working fluid to the rod side of the boom cylinder 16. When the control lever 22b is operated in a forward direction, the spool of the control valve 36 that controls the arm cylinder 17 is moved to the left in FIG. 2, supplying the hydraulic working fluid to the bottom side of the arm cylinder 17. When the control lever 22b is operated in a rearward direction, the spool of the control valve 36 is moved to the right in FIG. 2, supplying the hydraulic working fluid to the rod side of the arm cylinder 17. When the control lever 22a is operated in a leftward direction, the spool of the control valve 37 that controls the bucket cylinder 18 is moved to the left in FIG. 2, supplying the hydraulic working fluid to the bottom side of the bucket cylinder 18. When the control lever 22a is operated in a rightward direction, the spool of the control valve 37 is moved to the right in FIG. 2, supplying the hydraulic working fluid to the rod side of the bucket cylinder 18. When the control lever 22b is operated in a leftward direction, the spool of the control valve 38 that controls the turn motor 19 is moved to the left in FIG. 2, supplying the hydraulic working fluid to left side of the turn motor 19. When the control lever 22b is operated in a rightward direction, the spool of the control valve 38 is moved to the right in FIG. 2, supplying the hydraulic working fluid to the right side of the turn motor 19.

The degrees of opening of the control valves 35 through 38 vary according to the operation amounts by which the control levers 22a and 22b are operated. Specifically, the operation amounts by which the control levers 22a and 22b are operated define the speeds at which the hydraulic actuators 16 through 19 are operated. For example, when the operation amounts by which the control levers 22a and 22b are operated in a certain direction are increased, the degrees of opening of the control valves 35 through 38 in the corresponding direction are increased, increasing the rates at which the hydraulic working fluid flows as it is supplied to the hydraulic actuators 16 through 19 thereby to increase the speeds at which the hydraulic actuators 16 through 19 are operated. Consequently, the control signals generated by the control levers 22a and 22b have an aspect as speed commands for the hydraulic actuators 16 through 19. For this reason, the control signals generated by the control levers 22a and 22b may be herein referred to as speed commands for the hydraulic actuators 16 through 19 (the control valves 35 through 38).

The pressure of the hydraulic working fluid delivered from the main pump 39 (the hydraulic working fluid pressure) is regulated so as not to become excessive under a relief pressure by a relief valve 40 that is held in fluid communication with a hydraulic working fluid tank 41. The control valves 35 through 38 have return passages held in fluid communication with the hydraulic working fluid tank 41 for allowing the hydraulic working fluid supplied under pressure to the hydraulic actuators 16 through 19 to return to the hydraulic working fluid tank 41.

The controller 21 is supplied with signals input from the boom angle sensor 24, the arm angle sensor 25, the bucket angle sensor 26, the swinging angular velocity sensor 27, the inclination angle sensor 28, the boom bottom pressure sensor 29 and the boom rod pressure sensor 30 that are attached to the boom cylinder 16, and the arm bottom pressure sensor 31 and the arm rod pressure sensor 32 that are attached to the arm cylinder 17. The controller 21 calculates the load value of carried stuff (a carried load) carried by the front work implement 1 on the basis of these sensor signals, and displays the load measurement result on the monitor 23.

—System Configuration—

Figure 3:
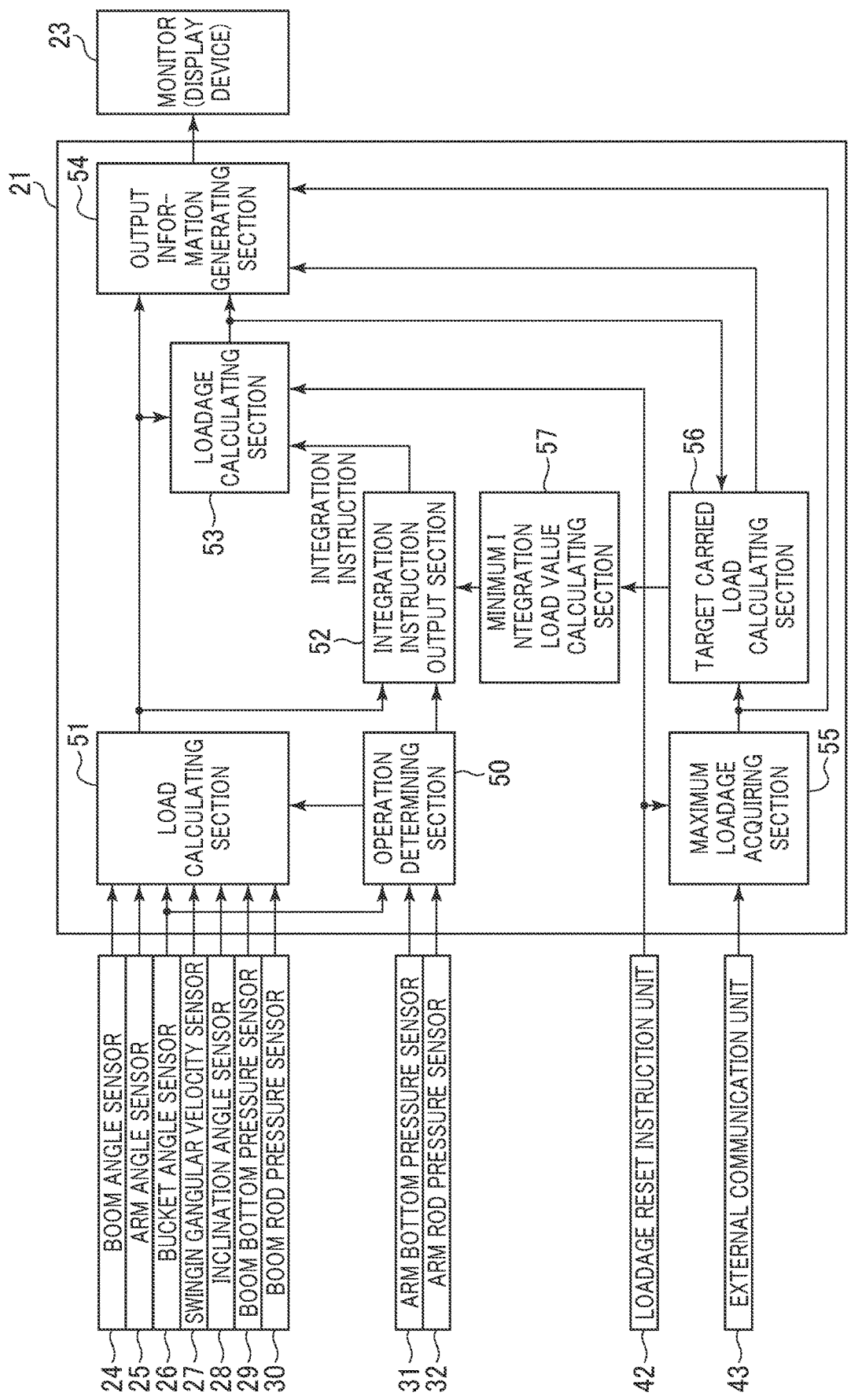
FIG. 3 is a schematic diagram illustrating the system configuration of the load measuring system according to the embodiment of the present invention.

FIG. 3 is a schematic diagram illustrating the system configuration of the load measuring system that is incorporated in the work machine according to the present embodiment. The load measuring system according to the present embodiment is installed as a combination of several software programs in the controller 21, and is supplied with signals input from the sensors 24 through 32, an integration reset instruction signal input from the loadage reset instruction unit 42, and information from the external communication unit 43 (data about maximum loadage of the dump truck 2), executes a process of calculating load values of carried stuff and an integrated values thereof, and the like in the controller 21, and displays the results of the process on the monitor 23.

FIG. 3 illustrates in the controller 21 the functions of the controller 21 as blocks. The controller 21 includes an operation determining section 50, a load calculating section 51, an integration instruction output section 52, a loadage calculating section 53, an output information generating section 54, a maximum loadage acquiring section 55, a target carried load calculating section 56, and a minimum integration load value calculating section 57.

The operation determining section 50 determines an operation (a carrying operation or a loading operation, for example) of the front work implement 12 on the basis of at least one of posture information of the front work implement 12 and load information of the actuators 16 and 17. When the operation determining section 50 determines that the front work implement 12 has performed a carrying operation on the transportation machine 2, the load calculating section 51 calculates a carried load representing the load value of carried stuff carried by the front work implement 12. In case predetermined conditions to be described later are satisfied, the integration instruction output section 52 outputs an integration instruction to the loadage calculating section 53. When the integration instruction from the integration instruction output section 52 is input to the loadage calculating section 53, the loadage calculating section 53 integrates carried loads calculated by the load calculating section 51, thereby calculating loadage of the transportation machine 2. When an integration reset instruction signal input from the loadage reset instruction unit 42 is input to the loadage calculating section 53, the loadage calculating section 53 resets the loadage calculated so far to zero.

When the loadage calculated by the loadage calculating section 53 is changed, the target carried load calculating section 56 calculates a target carried load representing a target value for a carried load per bucket to be transported in a next transporting operation, on the basis of the loadage calculated by the loadage calculating section 53. The maximum loadage acquiring section 55 acquires maximum loadage of the transportation machine 2 as a loading work target, through the external communication unit 43 in response to a predetermined signal as a trigger (an integration reset instruction signal input from the loadage reset instruction unit 42 according to the present embodiment). The target carried load calculating section 56 according to the present embodiment calculates a target carried load on the basis of remaining loadage that is obtained by subtracting the loadage calculated by the loadage calculating section 53 from the maximum loadage acquired by the maximum loadage acquiring section 55 and a remaining loading cycle count that is obtained by dividing the remaining loadage by a bucket volume.

The minimum integration load value calculating section 57 calculates a minimum integration load value representing a threshold value for carried loads that is used as one of the conditions under which the integration instruction output section 52 outputs an integration instruction, depending on the magnitude of a target carried load calculated by the target carried load calculating section 56. More specifically, the minimum integration load value calculating section 57 calculates a smaller minimum integration load value for a smaller target carried load. The minimum integration load value calculating section 57 according to the present embodiment calculates a minimum integration load value by determining which one of two minimum integration load values (a first set value and a second set value) is to be selected on the basis of the magnitude relationship between a target carried load calculated by the target carried load calculating section 56 and a preset minimum integrated load changing threshold value.

The integration instruction output section 52 according to the present embodiment outputs an integration instruction to the loadage calculating section 53 when the operation determining section 50 determines that the front work implement 12 has performed a transporting operation on the transportation machine 2 and when a carried load calculated by the load calculating section 51 is equal to or larger than a minimum integration load value calculated by the minimum integration load value calculating section 57. In other words, these two prerequisites represent the predetermined conditions under which the integration instruction output section 52 outputs an integration instruction.

The output information generating section 54 produces information to be displayed on the monitor 23 on the basis of the outputs from the load calculating section 51, the loadage calculating section 53, the maximum loadage acquiring section 55, and the target carried load calculating section 56. The monitor 23 displays the information produced by the output information generating section 54.

Next, a method in which the load measuring system of the work machine according to the embodiment of the present invention measures loads during a loading work, integrates the loads, and outputs loadage of a transportation machine will be described below with reference to FIGS. 4A and 4B through 10.

Figure 4A:
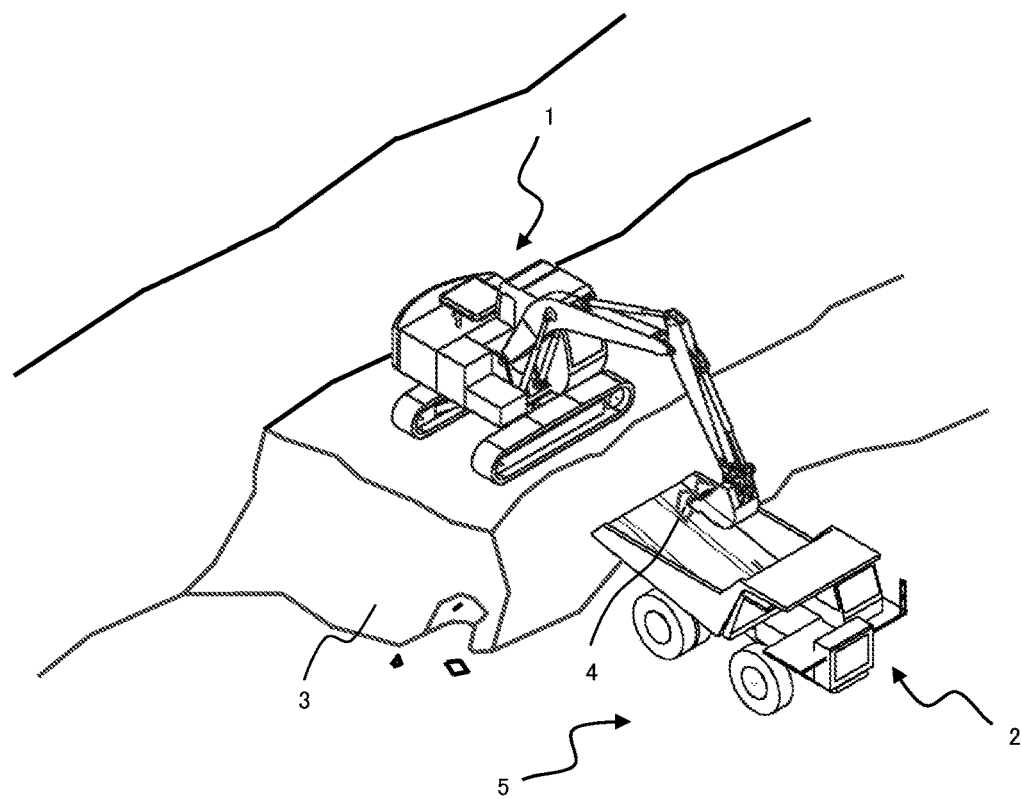
FIG. 4A is a perspective view illustrating an example of a loading work carried by a hydraulic excavator.
Figure 4B:
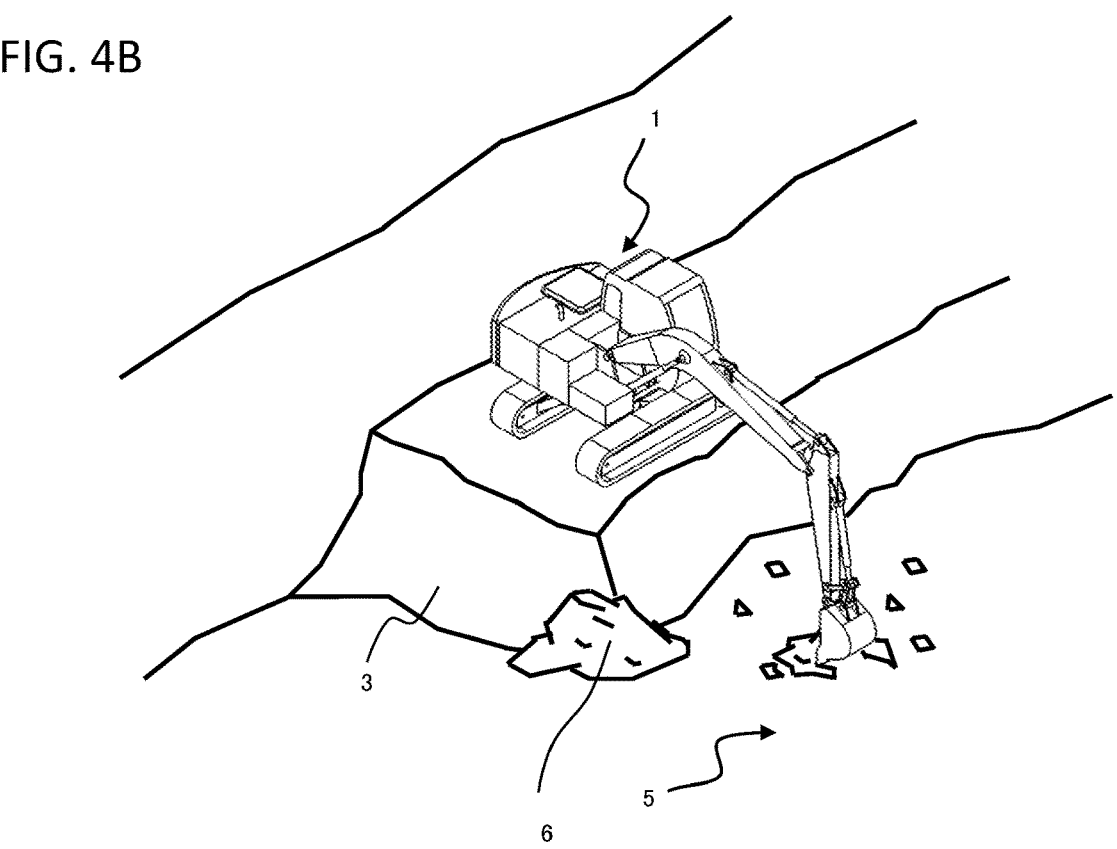
FIG. 4B is a perspective view illustrating an example of an operation-analogous non-loading work carried by the hydraulic excavator.

FIGS. 4A and 4B are perspective views illustrating an example of work carried out by the hydraulic excavator 1. FIG. 4A is a perspective view illustrating a "loading work" in which the hydraulic excavator 1 loads carried stuff excavated thereby (excavated stuff 4) onto the cargo bed of a transportation machine 2 (the loading work may also be referred to as "excavating and loading work" in case excavation accompanies loading as illustrated in FIG. 4A). FIG. 4B is a perspective view illustrating an "operation-analogous non-loading work" in which an operation identical or similar to an operation in an excavating and loading work is carried out, but no carried stuff is loaded onto the transportation machine 2 (the operation-analogous non-loading work includes a ground leveling work and a cleaning work, for example).

Generally, the excavating and loading work (see FIG. 4A) performed by the hydraulic excavator 1 has a cycle of four operations including an "excavating operation" for excavating an excavation target 3 and loading the bucket 15 with excavated stuff 4, a "carrying operation" for turning and moving the bucket 15 to a position above the cargo bed of the transportation machine 2 on a travel surface 5, a "loading operation" for discharging the excavated stuff 4 onto the transportation machine 2 after the carrying operation, and a "reaching operation" for moving the bucket 15 to the position of the excavation target 3 after the loading operation. The hydraulic excavator 1 repeats the above four operations until the cargo bed of the transportation machine 2 is filled with the carried stuff. The carrying operation is performed in most cases by swinging boom raising. The loading operation is performed in most cases by bucket dumping.

If the cargo bed of the transportation machine 2 is excessively loaded with excavated stuff 4, then the transportation machine 2 is overloaded, requiring a reloading work and tending to cause damage to the transportation machine 2. If the cargo bed of the transportation machine 2 is underloaded, then the amount of stuff that is transported by the transportation machine 2 is reduced, resulting in a reduction in working efficiency at site. Therefore, it is necessary to optimize loadage of the transportation machine 2. A carried load representing the load value of the excavated stuff 4 is measured during a carrying operation. The carried load and loadage of the transportation machine 2 that is determined by integrating carried loads are presented to the operator of the hydraulic excavator 1, allowing the operator to grasp whether the transportation machine 2 is presently loaded appropriately or not, so that the loadage of the transportation machine 2 can be optimized.

During the excavating and loading work as illustrated in FIG. 4A, the hydraulic excavator 1 occasionally performs a cleaning work in which it gathers gravel on the travel surface 5 and around the excavation target 3 and carries the gathered gravel to a stock 6, as illustrated in FIG. 4B. For example, when the excavating and loading work as illustrated in FIG. 4A is continued, the excavated stuff 4 may be spilled from the hydraulic excavator 1 as it loads the transportation machine 2 with the excavated stuff 4 and the excavation target 3 may collapse, with gravel scattered around on the travel surface 5 for the transportation machine 2. Since the scattered gravel may prevent the transportation machine 2 from entering the spot where a loading work is to be carried out, and an excavating and loading work may not be carried out, the hydraulic excavator 1 performs a cleaning work to get rid of obstructive gravel therearound. In addition, in order for the hydraulic excavator 1 to perform an excavating and loading work efficiently, the hydraulic excavator 1 performs a ground leveling work to shape the excavation target 3 prior to arrival of a next transportation machine 2 for keeping the excavation target 3 within the working range of the hydraulic excavator 1. The cleaning work and the ground leveling work are similar to the excavating and loading work as illustrated in FIG. 4A, and accompany carrying of carried stuff. For accurately calculating loadage of the transportation machine, therefore, it is necessary to distinguish operation-analogous non-loading works such as a cleaning work, a ground leveling work, and the like and a loading work on the transportation machine from each other and integrate carried loads only while the loading work is being performed.

—Determination of Operation of the Front Work Implement by the Operation Determining Section 50—

Figure 5:
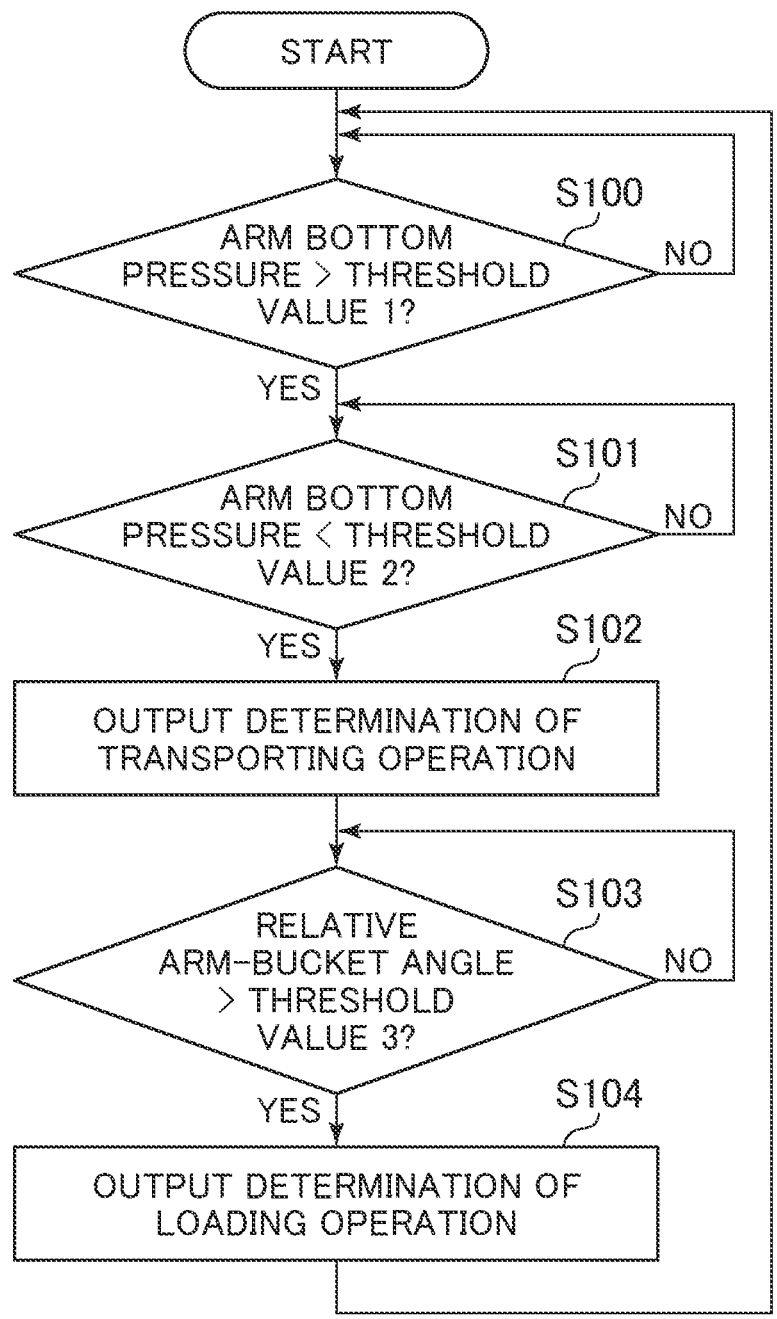
FIG. 5 is a flowchart illustrating a method of determining whether the load measuring system according to the embodiment of the present invention is carrying out a carrying operation and a loading operation.
Figure 6:
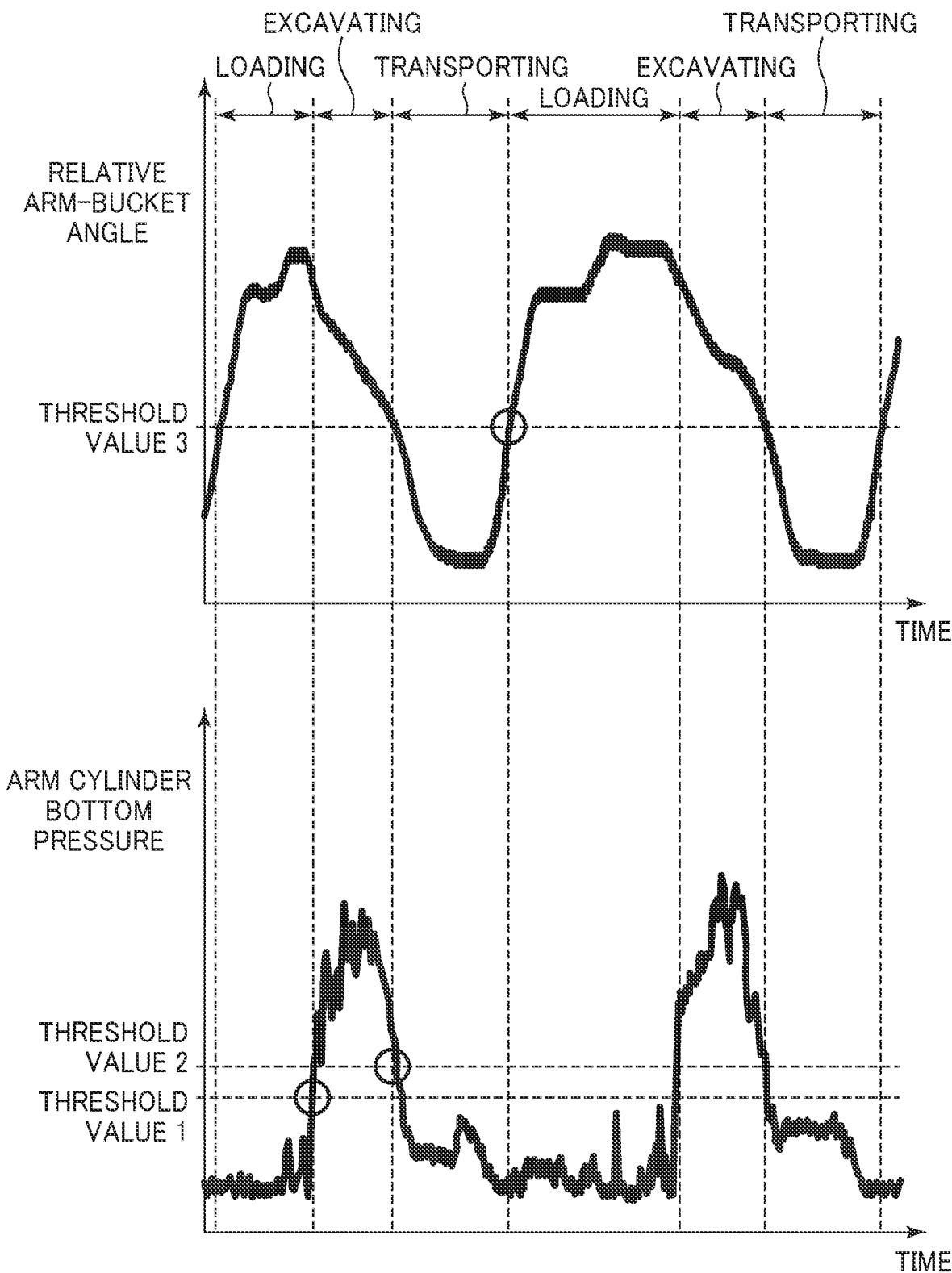
FIG. 6 is a graph illustrating the method of determining whether the load measuring system according to the embodiment of the present invention is carrying out the carrying operation and the loading operation.

FIG. 5 is a flowchart illustrating a method in which the operation determining section 50 of the controller 21 determines whether the front work implement 12 starts and finishes carrying the carried stuff 4 to a position above the cargo bed of the dump truck 2. FIG. 6 illustrates by way of example a graph depicting the relationship between sensed values of the arm bottom pressure sensor 31 (an arm cylinder bottom pressure) and sensed values of the bucket angle sensor 26 (a relative arm-bucket angle) and determined results from the operation determining section 50.

The flowchart of FIG. 5 is executed in each of sampling periods determined by the controller 21 of the hydraulic excavator 1.

The operation determining section 50 monitors the output of the arm bottom pressure sensor 31 and determines whether the output rises from a state lower than a preset threshold value 1 and exceeds the threshold value 1 or not, in step S100. Since the hydraulic excavator 1 excavates the excavation target by extending the arm cylinder 17, the arm cylinder bottom pressure increases during an excavating operation as indicated by a lower portion of the graph illustrated in FIG. 6. According to the present embodiment, therefore, the operation determining section 50 determines that the hydraulic excavator 1 has started an excavating operation at the time when the arm cylinder bottom pressure exceeds the threshold value 1. If the operation determining section 50 determines that the arm cylinder bottom pressure rises from the state lower than the threshold value 1 and exceeds the threshold value 1 in step S100, then the operation determining section 50 determines that the hydraulic excavator 1 has started an excavating operation, and controls goes to step S101. Conversely, if the operation determining section 50 determines that the arm cylinder bottom pressure rises from the state lower than the threshold value 1, but does not exceed the threshold value 1 (remains equal to or lower than the threshold value 1) then control goes back to step S100 in which the operation determining section 50 keeps monitoring the output of the arm bottom pressure sensor 31.

In step S101, the operation determining section 50 continuously monitors the output of the arm bottom pressure sensor 31 and determines whether the output falls from a state higher than a preset threshold value 2 and drops below the threshold value 2 or not. The arm cylinder bottom pressure is reduced when an excavating operation is finished as indicated by a lower portion of the graph illustrated in FIG. 6. According to the present embodiment, therefore, the operation determining section 50 determines that the hydraulic excavator 1 has finished an excavating operation and has started a carrying operation at the time when the arm cylinder bottom pressure drops below the threshold value 2. If the operation determining section 50 determines that the arm cylinder bottom pressure falls from the state higher than the threshold value 2 and drops below the threshold value 2 in step S101, then the operation determining section 50 determines that the hydraulic excavator 1 has finished an excavating operation and has started a carrying operation, and controls goes to step S102. Conversely, if the operation determining section 50 determines that the arm cylinder bottom pressure falls from the state higher than the threshold value 2, but does not drop below the threshold value 2 (remains equal to or higher than the threshold value 2) then the operation determining section 50 determines that the excavating operation continues, and control goes back to step S101 in which the operation determining section 50 keeps monitoring the output of the arm bottom pressure sensor 31.

With respect to the relationship between the threshold value 1 and the threshold value 2, the relationship of the threshold value 1<the threshold value 2 is established in the example illustrated in FIG. 6. However, the relationship is by way of example only, and the threshold values may be set to any desired values insofar as they make it possible to determine whether an excavating operation of the hydraulic excavator 1 has started and finished or not. In the determining process, the magnitude relationship between the threshold value 1 and the threshold value 2 does not matter.

In step S102, the operation determining section 50 outputs a determination that a carrying operation has started (a carrying operation determination) to an external destination, and then control goes to step S103. The external destination of the determination includes the load calculating section 51.

In step S103, the operation determining section 50 monitors the output of the bucket angle sensor 26, and determines whether a relative arm-bucket angle (an angle formed between the arm 14 and the bucket 15) rises from an angle smaller than a preset threshold value 3 and exceeds the threshold value 3 or not. The hydraulic excavator 1 that has finished a carrying operation and started a loading operation operates to decrease the angle formed between the arm 14 and the bucket 15 in order to discharge gravel (carried stuff) from the bucket 15. Specifically, the relative angle between the arm 14 and the bucket 15 increases upon a transition from a carrying operation to a loading operation as indicated by an upper side of the graph illustrated in FIG. 6. According to the present embodiment, therefore, the operation determining section 50 determines that the hydraulic excavator 1 has finished a carrying operation and has started a loading operation at the time when the relative angle between the arm 14 and the bucket 15 exceeds the threshold value 3. If the operation determining section 50 determines that the relative angle between the arm 14 and the bucket 15 exceeds the threshold value 3 in step S103, then the operation determining section 50 determines that the hydraulic excavator 1 has finished the carrying operation and has started a loading operation, and controls goes to step S104. Conversely, if the operation determining section 50 determines that the relative angle between the arm 14 and the bucket 15 does not exceed the threshold value 3 (remains smaller than the threshold value 3) then the operation determining section 50 determines that the carrying operation continues, and control goes back to step S103 in which the operation determining section 50 keeps monitoring the output of the bucket angle sensor 26.

In step S104, the operation determining section 50 outputs a determination that a loading operation has started (a loading operation determination) to an external destination and then control goes back to step S100. The external destination of the determination includes the load calculating section 51 and the integration instruction output section 52.

—Load Value Calculation by the Load Calculating Section 51—

Figure 7:
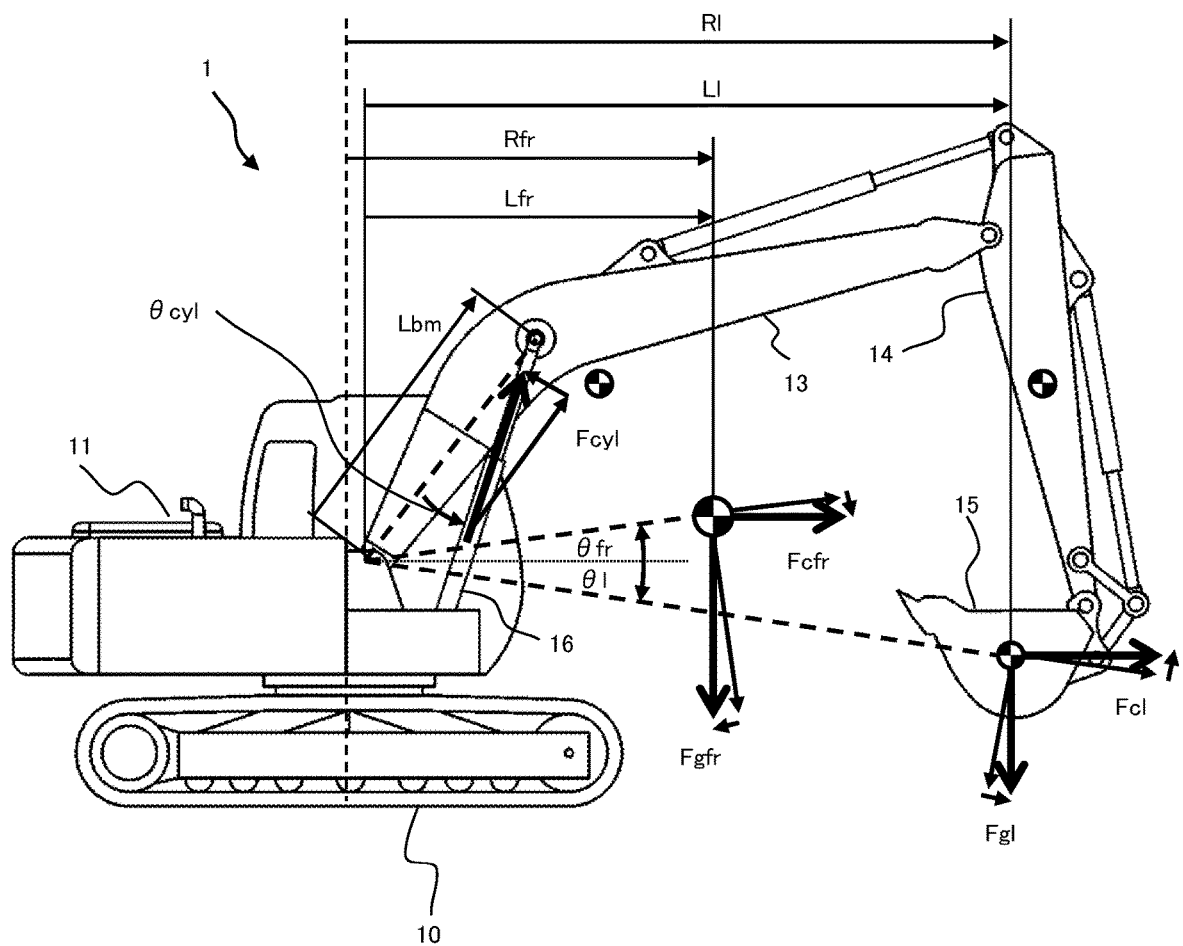
FIG. 7 is a side elevational view illustrating a load calculating method carried out by the load measuring system according to the embodiment of the present invention.

FIG. 7 is a view illustrating a method in which the load calculating section 51 of the controller 21 calculates an instantaneous load Ml of carried stuff in the bucket 15. The method in which the load calculating section 51 calculates a load will be described below with reference to FIG. 7. The measurement of a load uses equilibrium between a torque acting around the axis of angular movement of the boom 13 and produced by the boom cylinder 16, a torque produced by the front work implement 12 under the gravitational force and the swinging centrifugal force, and a torque produced by carried stuff under gravitational forces and swinging centrifugal forces.

A thrust force Fcyl of the boom cylinder 16 is calculated according to the following equation (1) where P1 represents the output signal from the boom bottom pressure sensor 29, P2 the output signal from the boom rod pressure sensor 30, and A1 and A2 the pressure-bearing areas of the boom cylinder 16:

$$Fcyl = A1 \cdot P1 - A2 \cdot P2 \quad (1)$$

A torque Tbm produced by the boom cylinder 16 is calculated according to the following equation (2) where Lbm represents the length of a line segment inter-connecting the axis of angular movement of the boom 13 and the point on which the thrust force of the boom cylinder 16 acts, and θcyl the angle formed between the direction of the thrust force Fcyl of the boom cylinder 16 and the line segment having the length Lbm:

$$Tbm = Fcyl \cdot Lmb \cdot \sin(\theta cyl) \quad (2)$$

A torque Tgfr produced by the front work implement 12 under the gravitational force is calculated according to the following equation (3) where Mfr represents the weight at the center of gravity of the front work implement 12, g the gravitational acceleration, Lfr the length in the longitudinal directions from the axis of angular movement of the boom 13 to the center of gravity of the front work implement 12, and θfr the angle formed between a line segment interconnecting the axis of angular movement of the boom 13 and the center of gravity of the front work implement 12 and a horizontal plane:

$$Tgfr = Mfr \cdot g \cdot Lfr \cdot \cos(\theta fr) \quad (3)$$

A torque Tcfr produced by the front work implement 12 under the swinging centrifugal force is calculated according to the following equation (4) where Rfr represents the length in the longitudinal directions from the center of swinging motion of the upper swing structure 12 to the center of gravity of the front work implement 12, and ω the swinging angular velocity:

$$Tcfr = Mfr \cdot Rfr \cdot \omega^2 \cdot \sin(\theta fr) \quad (4)$$

Mfr, Lfr, Rfr, and θfr are calculated from the preset lengths, the preset positions of the centers of gravity, and the preset weights of the upper swing structure 11, the boom 13, the arm 14, and the bucket 15, respectively, and the angle signals output from the boom angle sensor 24, the arm angle sensor 25, and the bucket angle sensor 26.

A torque Tgl produced by the carried stuff under the gravitational force is calculated according to the following equation (5) where Ml represents the weight of the carried stuff, L1 the length in the longitudinal directions from the axis of angular movement of the boom 13 to the center of gravity of the carried stuff, and θ1 the angle formed between the line segment interconnecting the axis of angular movement of the boom 13 and the center of gravity of the carried stuff and a horizontal plane:

$$Tgl = Ml \cdot g \cdot Ll \cdot \cos(\theta 1) \quad (5)$$

A torque Tcl produced by the carried stuff under the swinging centrifugal force is calculated according to the following equation (6) where Rl represents the length in the longitudinal directions from the center of swinging motion of the upper swing structure 11 to the center of gravity of the bucket 15:

$$Tcl = Ml \cdot Rl \cdot \omega^2 \cdot \sin(\theta 1) \quad (6)$$

The equilibrium expressed by the equations (2) through (6) is modified and developed with respect to the weight Ml of the carried stuff. The weight Ml of the carried stuff is calculated according to the following equation (7):

$$Ml = (Tbm - Tgfr - Tcfr)/(Ll \cdot g \cdot \cos(\theta 1) + Rl \cdot \omega^2 \cdot \sin(\theta l)) \quad (7)$$

The load calculated according to the equations (1) through (7) cannot be of a constant value during the carrying operation due to sensor noises and hydraulic circuit characteristics. Therefore, weights Ml of the carried stuff that have been calculated during a predetermined period in the carrying operation are averaged to finalize a load.

—Calculation of a Target Carried Load, a Minimum Integration Load Value, a Carried Load, and an Integrated Value of Carried Loads—

Figure 8:
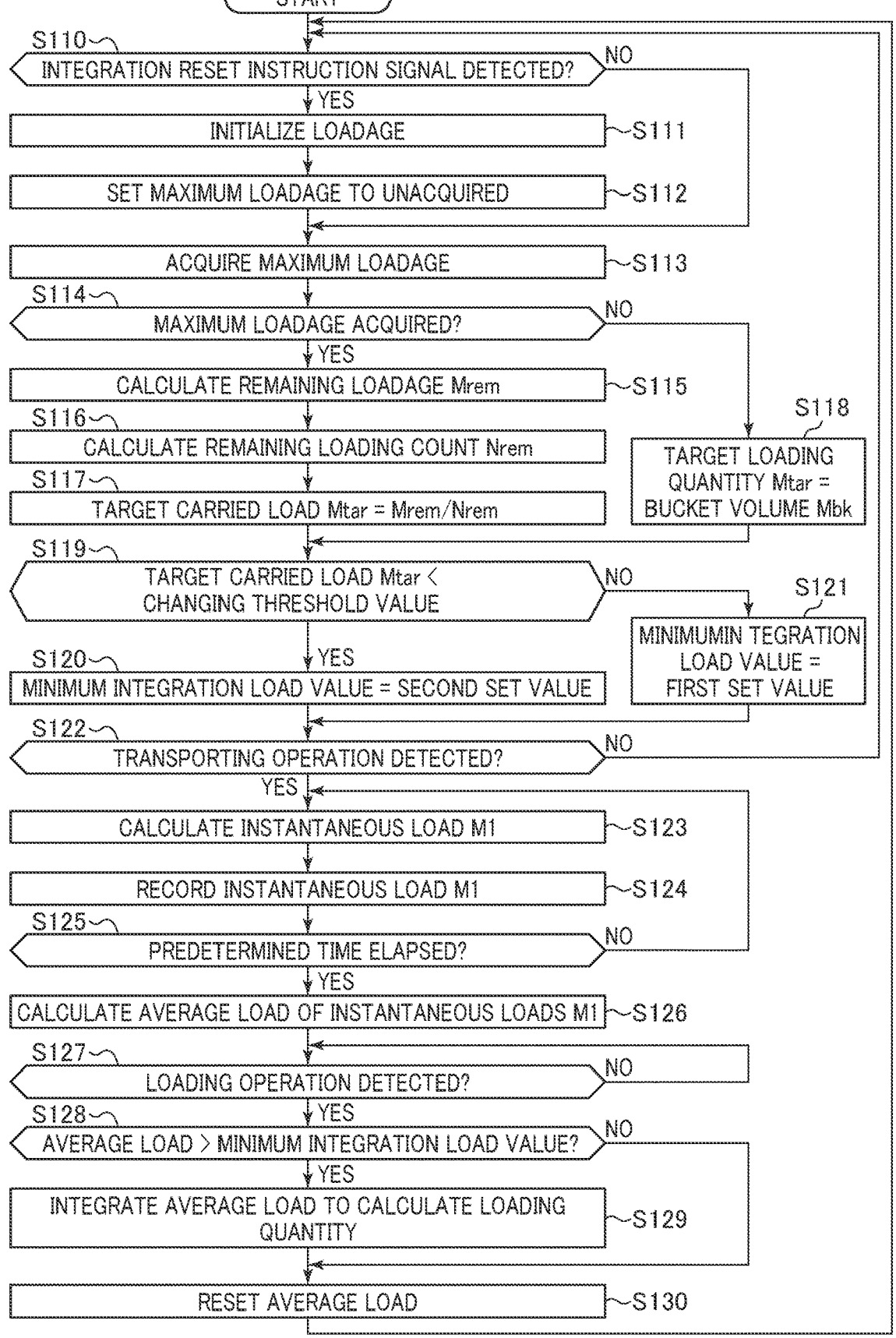
FIG. 8 is a flowchart of a method in which the load measuring system according to the embodiment of the present invention integrates loads to calculate loadage of a transportation machine and a method in which the load measuring system according to the embodiment of the present invention changes the magnitude of a minimum integrated load for permitting an integration.
Figure 9:
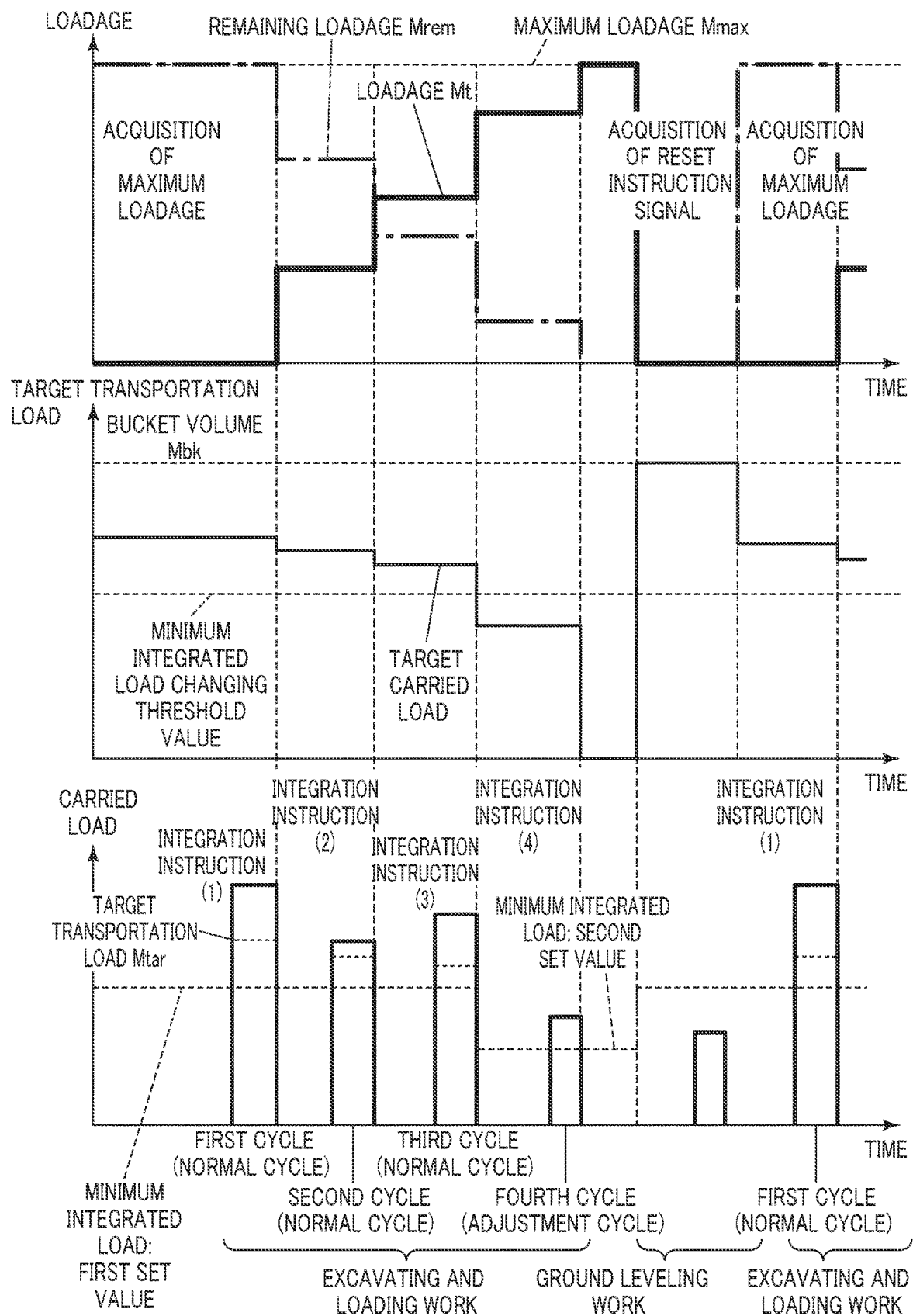
FIG. 9 is a graph illustrating the method in which the load measuring system according to the embodiment of the present invention changes the magnitude of the minimum integrated load.

A method in which the target carried load calculating section 56 calculates a target carried load per bucket depending on loadage of the transportation machine 2, the minimum integration load value calculating section 57 sets a minimum integration load value depending on a target carried load value, and thereafter the integration instruction output section 52 determines whether carried loads output from the load calculating section 51 are to be integrated or not will be described below with reference to FIGS. 8 and 9. FIG. 8 is a flowchart of a process for finalizing and integrating carried loads that is carried out by the controller 21 according to the first embodiment. FIG. 9 is a graph illustrating an example of changes in loadage Mt, a target carried load Mtar, a carried load, and a minimum integration load value according to the present embodiment. FIG. 9 illustrates in an upper portion thereof how the loadage Mt changes, the loadage Mt being indicated by the solid-line curve, remaining loadage Mrem by the dot-and-dash-line curve, and maximum loadage Mmax by the broken-line curve. FIG. 9 illustrates in a middle portion thereof how the target carried load Mtar changes, the target carried load Mtar being indicated by the solid-line curve, and a minimum integrated load changing threshold value and a bucket volume Mbk by the broken-line curves. FIG. 9 illustrates in a lower portion thereof how a carried load changes in a bar chart, a target carried load being indicated in each bar, and a minimum integration load value as it changes by the dotted-line curve.

Each of the steps illustrated in FIG. 8 is executed in every predetermined sampling period by the controller 21.

In step S110, the loadage calculating section 53 senses whether an integration reset instruction signal is output from the loadage reset instruction unit 42 or not. If an integration reset instruction signal is not sensed, then control goes to step S113. On the other hand, if an integration reset instruction signal is sensed in step S110, then the loadage calculating section 53 resets loadage of the transportation machine 2 to zero in step S111 (see "LOADAGE" in the upper portion of FIG. 9). In step S112, the maximum loadage acquiring section 55 sets a maximum loadage acquisition flag that is held in the controller 21 with respect to the acquisition of maximum loadage Mmax, to an unacquired state, after which control goes to step S113.

In step S113, the maximum loadage acquiring section 55 acquires maximum loadage Mmax on the transportation machine 2 from the transportation machine 2 as a loading work target, via the external communication unit 43. For example, there is a method in which the maximum loadage acquiring section 55 sends a maximum loadage output request to the transportation machine 2 and, in response to the request, the transportation machine 2 sends maximum loadage information to the maximum loadage acquiring section 55 of the hydraulic excavator 1. In case the maximum loadage acquiring section 55 is unable to acquire maximum loadage Mmax via the external communication unit 43 due to a communication failure, for example, the maximum loadage acquiring section 55 keeps the maximum loadage acquisition flag in the unacquired state. In case the maximum loadage acquiring section 55 has acquired maximum loadage Mmax, the maximum loadage acquiring section 55 sets the maximum loadage acquisition flag to an acquired state.

In step S114, the target carried load calculating section 56 reads the maximum loadage acquisition flag and determines whether the maximum loadage acquiring section 55 has acquired maximum loadage Mmax on the transportation machine 2 or not. If the target carried load calculating section 56 determines that the maximum loadage acquiring section 55 has not acquired maximum loadage Mmax (i.e., if the maximum loadage acquisition flag is in the unacquired state) then the target carried load calculating section 56 sets, in step S118, a target carried load to the predetermined volume Mbk of the bucket 15 during a period from the acquisition of a reset instruction signal to the acquisition of maximum loadage in "TARGET CARRIED LOAD" in the middle portion of FIG. 9, after which control goes to step S119. If the target carried load calculating section 56 determines that the maximum loadage acquiring section 55 has acquired maximum loadage Mmax (i.e., if the maximum loadage acquisition flag is in the acquired state) then control goes to step S115 in which the target carried load calculating section 56 calculates a target carried load.

In step S115, the target carried load calculating section 56 calculates remaining loadage Mrem by finding the difference between the maximum loadage Mmax on the transportation machine 2 that has been acquired by the maximum loadage acquiring section 55 and the loadage Mt that has been calculated by the loadage calculating section 53. Then, in step S116, the target carried load calculating section 56 calculates a remaining loading cycle count Nrem on the basis of the remaining loadage Mrem calculated in step S115 and the bucket volume Mbk according to the following equation (8) where Ceil represents rounding up to an integer:

$$Nrem = Ceil(Mrem/Mbk) \tag{8}$$

In step S117, the target carried load calculating section 56 calculates a target carried load Mtar by finding a quotient produced by dividing the remaining loadage Mrem (step S115) by the remaining loading cycle count Nrem (step S116), after which control goes to step S119. As indicated in the columns "TARGET CARRIED LOAD Mtar" and "CARRIED LOAD" in the middle and lower portions of FIG. 9, a succession of carrying cycles in excess of the target carried load Mtar may result in a reduced target carried load in the last loading cycle.

In step S119, the minimum integration load value calculating section 57 determines whether the target carried load Mtar is smaller than a minimum integrated load changing threshold value recorded in the controller 21 (the minimum integration load value calculating section 57) or not. If the target carried load Mtar is smaller than the minimum integrated load changing threshold value, then the minimum integration load value calculating section 57 calculates a second set value as a minimum integration load value as indicated in the column "CARRIED LOAD" in the lower portion of FIG. 9 in step S120, after which control goes to step S122. If the target carried load Mtar is equal to or larger than the minimum integrated load changing threshold value, then the minimum integration load value calculating section 57 calculates a first set value as a minimum integration load value in step S121, after which control goes to step S122. The second set value is smaller than the first set value. For example, the first set value may be set to two thirds of the bucket volume Mbk, and the second set value may be set to a value ranging from one third of the bucket volume Mbk to one half of the bucket volume Mbk. The first set value and the second set value are smaller than the target carried load by their nature. Consequently, the first set value and the second set value may be defined as proportions of the target carried load.

As indicated in the column "CARRIED LOAD" in the lower portion of FIG. 9, in an operation-analogous non-loading work such as a ground leveling work, the bucket 15 is less likely to be filled with carried stuff, and the carried load measured during a carrying operation is often smaller than the carried load measured in other cycles (normal cycles) other than the final cycle of a loading work on the transportation machine 2 as a work target. Therefore, it is necessary to maximize a minimum integration load value during normal cycles to exclude the carried load during an operation-analogous non-loading work from an integration target. On the other hand, in the final cycle of a loading work on the transportation machine 2 as a work target, the carried load is adjusted to match the remaining loadage by the operator of the hydraulic excavator 1, and the target carried load Mtar is often smaller than in the normal cycles (for the reason described above, the final cycle may be herein referred to as "adjustment cycle," whereas the other cycles as "normal cycles"). The carried load in the final cycle (the adjustment cycle) of a loading work is thus likely to be as small as the carried load measured in a carrying operation of an operation-analogous non-loading work, and it is necessary to make a minimum integration load value in the final cycle of a loading work relatively smaller than in the normal cycles. Consequently, as illustrated in FIG. 9, the minimum integration load value calculating section 57 according to the present embodiment calculates a minimum integration load value depending on the magnitude of the target carried load Mtar, and the integration instruction output section 52 distinguishes a loading work and an operation-analogous non-loading work from each other on the basis of the minimum integration load value thus calculated to determine whether an integration is required or not.

In step S122, the load calculating section 51 monitors whether the operation determining section 50 has output a carrying operation determination or not. In case the load calculating section 51 has sensed a carrying operation determination, control goes to step S123. Otherwise, control returns to step S110.

In step S123, the load calculating section 51 performs calculations relative to the equations (1) through (7) to calculate an instantaneous excavated stuff weight (an instantaneous load value) Ml. In step S124, the load calculating section 51 records the instantaneous load value Ml, after which control goes to step S125.

In step S126, the load calculating section 51 determines whether a predetermined time (which may be referred to as "load calculating period") has elapsed from the outputting of a carrying operation determination from the operation determining section 50 or not. If the predetermined time has not elapsed, then control goes back to step S123 to execute steps S123, and S124 again. If the predetermined time has elapsed, then control goes to step S126.

In step S127, the load calculating section 51 calculates an average load value of instantaneous load values Ml calculated during the predetermined time. Since the instantaneous load values Ml are different from sampling to sampling, they are averaged during the predetermined time to finalize a carried load. The calculated carried load is output to the integration instruction output section 52, the loadage calculating section 53, the output information generating section 54.

The integration instruction output section 52 monitors in step S127 whether a carrying operation determination has been output from the operation determining section 50 or not. If a carrying operation determination has not been output in step S127, control goes back to step S127 to continue monitoring the outputting of a carrying operation determination. If a carrying operation determination has been sensed, control goes to step S128.

In step S128, the integration instruction output section 52 determines whether the average (the carried load) of the instantaneous load values Ml calculated in step S126 is larger than the minimum integration load value calculated in step S120 or S121 or not. If the carried load is larger than the minimum integration load value, the integration instruction output section 52 outputs an integration instruction, after which control goes to step S129. Otherwise, control goes to step S130.

In step S129, the loadage calculating section 53 integrates the carried load calculated in step S126 into an integrated value of carried loads that has been held in the controller 21, and outputs the integrated load as loadage of the transportation machine 2 to the output information generating section 54 and the maximum loadage acquiring section 56, after which control goes to step S130.

In step S130, the load calculating section 51 resets the instantaneous load value Ml recorded in step S124, after which control goes back to step S110.

Figure 10:
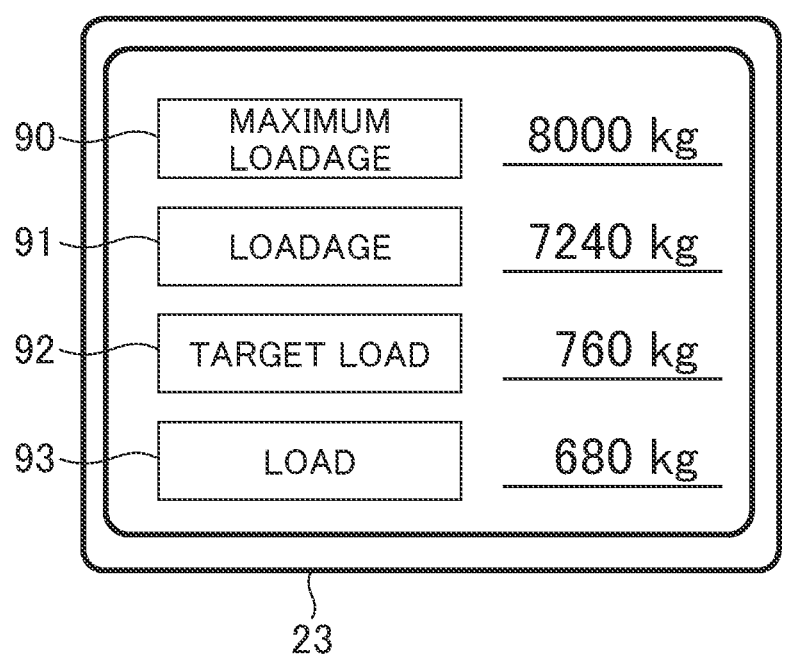
FIG. 10 is a view illustrating an output screen of a monitor of the load measuring system according to the embodiment of the present invention.

FIG. 10 is a view illustrating an output screen of the monitor 23 according to the present embodiment. The output from the output information generating section 54 and contents of the result of the load measurement that are displayed on the monitor 23 will be described below with reference to FIG. 10.

As illustrated in FIG. 10, the output information generating section 54 displays maximum loadage 90 of the transportation machine 2 acquired in step S113 and input from maximum loadage acquiring section 55, loadage 91 of the transportation machine 2 calculated in step S129 and input from the loadage calculating section 53, target carried load 92 calculated in step S117 or S118 and input from the target carried load calculating section 56, and carried load 93 calculated in step S126 and input from the load calculating section 51, as numerical values on the monitor 23.

—Operation•Advantages—

Operation and advantages of the present embodiment will be described below with reference to FIG. 9. In the example of FIG. 9, the hydraulic excavator 1 completes an excavating and loading work on the transportation machine 2 as a loading target in four cycles (in four loading cycles). In the normal cycles from the first cycle in which the transportation machine 2 starts to be loaded to the third cycle, the remaining loadage Mrem is larger than the minimum integrated value changing threshold value, and the target carriage load Mtar in each cycle exceeds the minimum integrated value changing threshold value (the middle portion of FIG. 9). Therefore, the minimum integration load value calculating section 57 keeps the minimum integrated value changing threshold value as the first set value (the lower portion of FIG. 9). In the normal cycles, since the operator of the hydraulic excavator 1 tries to put as much carried stuff into the bucket 15, all the carried loads in the first through third cycles that are calculated by the load calculating section 51 exceed the first set value (the lower portion of FIG. 9). Consequently, each time the operation determining section 50 senses a loading operation, the integration instruction output section 52 outputs an integration instruction, and the loadage calculating section 53 integrates each of the carried loads (the upper portion of FIG. 9). Even if an operation-analogous non-loading work such as a ground leveling work or the like is carried out prior to the first cycle or during the first through third cycles, and a carried load is measured and a loading operation is sensed in the operation-analogous non-loading work, since the carried load in the operation-analogous non-loading work is in most cases smaller than the first set value, the carried load is excluded from an integration target.

In the fourth cycle (the adjustment cycle) where the last loading operation takes place, since the remaining loadage Mrem is small and a carried load is investigated (the upper portion of FIG. 9), the target carried load Mtar becomes smaller than the minimum integrated load changing threshold value (the middle portion of FIG. 9). Therefore, the minimum integration load value calculating section 57 changes the minimum integration load value from the first set value to the second set value that is smaller than the first set value (the lower portion of FIG. 9). The carried load in the fourth cycle that is calculated by the load calculating section 51 is smaller than the carried loads in the other cycles, but exceeds the second set value (the lower portion of FIG. 9). Consequently, when a loading operation is sensed by the operation determining section 50, the integration instruction output section 52 outputs an integration instruction, causing the integration calculating section 53 to integrate the carried load in the fourth cycle (the upper portion of FIG. 9). As the fourth cycle is a cycle where the carried load is adjusted to make the loadage of the transportation machine 2 closer to the maximum loadage, the loadage of the transportation machine 2 can be made closer to the maximum loadage.

When the last fourth loading operation is finished and the loading work on the transportation machine 2 is completed, the operator operates the loadage reset instruction unit 42 to reset the integrated value of the carried loads to zero (the upper portion of FIG. 9). Since the remaining loadage Mrem thus increases to make the target carried load Mtar exceed the minimum integrated load changing threshold value (the middle portion of FIG. 9), the minimum integration load value calculating section 57 returns the minimum integration load value from the second set value to the first set value (the lower portion of FIG. 9). Consequently, even if an operation-analogous non-loading work is carried out and a small carried load less than the first set value is measured before a first loading operation (a first cycle) is started on a new transportation machine 2, because the integration instruction output section 52 does not output an integration instruction, the carried load in the operation-analogous non-loading work is prevented from being integrated.

As described above, the hydraulic excavator 1 according to the present embodiment adds the fact that a carried load exceeds a minimum integration load value as a condition for an integration, and the magnitude of the minimum integration load value is changed depending on the magnitude of the target carried load Mtar calculated each time the loadage Mt (the remaining loadage Mrem) is changed. Therefore, as an integration is carried out only when a carried load based on the progress of a loading work is measured, even if a carried load smaller than a carried load in a normal loading work is measured in an operation-analogous non-loading work, the measure carried load is excluded from an integration target. In other words, inasmuch as an operation-analogous non-loading work is distinguished highly accurately and a carried work measured in the operation-analogous non-loading work is excluded from an integration target, the accuracy of the calculated value Mt of loadage of the transportation machine 2 is increased.

The calculation method of a minimum integration load value is not limited to the method described above, but a minimum integration load value may be calculated according to other methods. For example, a plurality of minimum integration load changing threshold values may be established, and a plurality of minimum integration load values may be established depending on the minimum integration load changing threshold values. Alternatively, a relationship between target carried loads and minimum integration load values may be determined in advance as a table or the like such that as a target carried load decreases, a minimum integration load value also decreases, and the minimum integration load value calculating section 57 may calculate a minimum integration load value depending on the magnitude of a target carried load according to the table.

Second Embodiment

Figure 11:
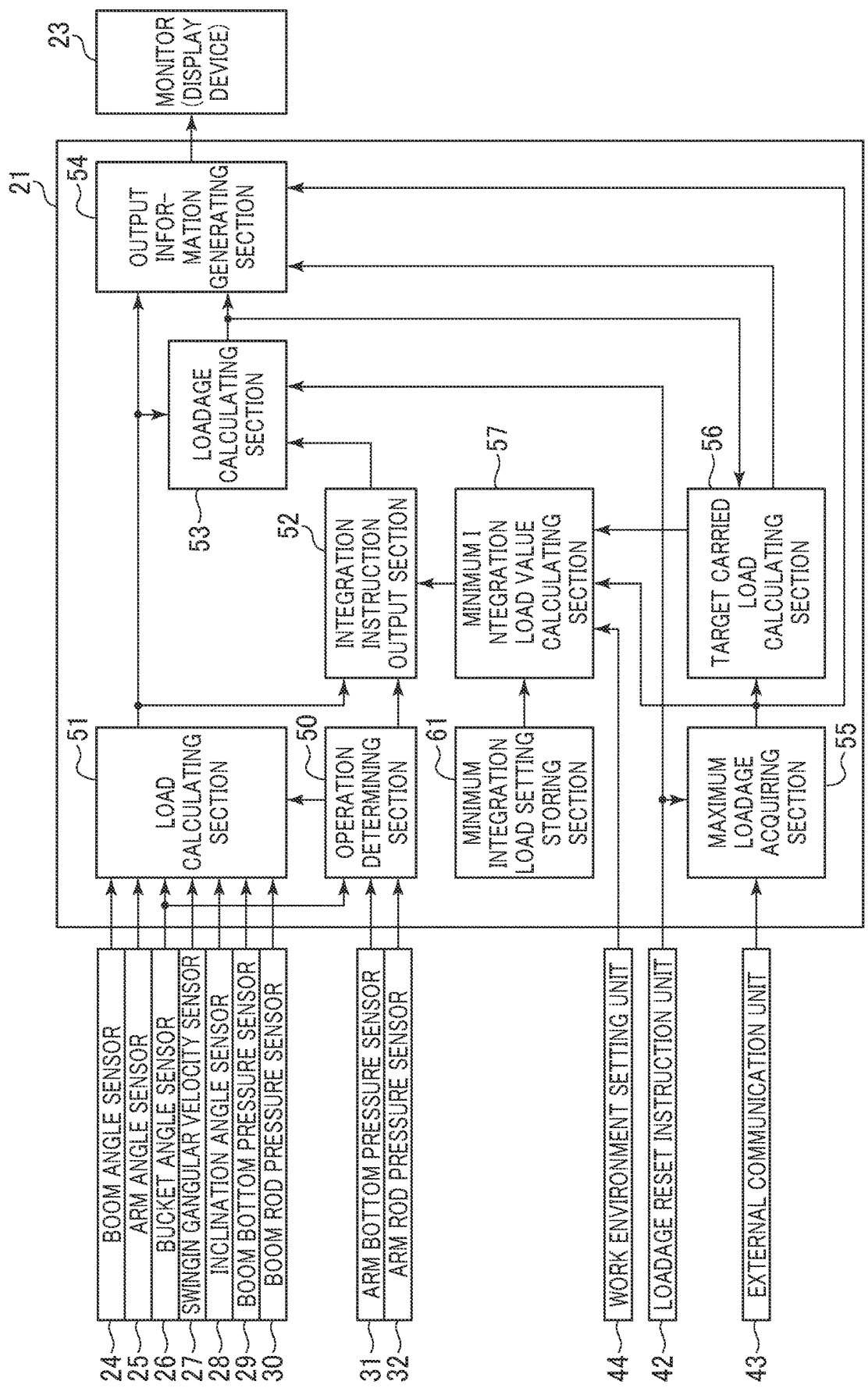
FIG. 11 is a schematic diagram illustrating the system configuration of a load measuring system according to a different embodiment of the present invention.

A work machine according to a second embodiment of the present invention will be described below with reference to FIGS. 11 and 12. According to the present embodiment, the magnitude of a minimum integration threshold value is changed on the basis of the type of carried stuff and maximum loadage of a transportation machine. FIG. 11 is a schematic diagram illustrating the system configuration of a load measuring system that is incorporated in the work machine according to the present embodiment. FIG. 12 is a graph illustrating methods in which a hydraulic excavator according to the present embodiment changes the magnitude of a minimum integration load value that permits an integration of a carried load. Those parts according to the present embodiment which are identical to those according to the previous embodiment are denoted by identical reference characters, and their description may be omitted below (this will hold true for subsequent embodiments).

A controller 21 illustrated in FIG. 11 includes the sections according to the first embodiment, and in addition is arranged to accept an input from a work environment setting unit 44 that sets the type of an excavation target 3 (sand, soil, clay, iron ore, coal, or the like). The controller 21 further includes a minimum integration load setting storing section 61 that stores the settings of a plurality of minimum integration load value, and a minimum integration load value calculating section 57 for selecting a minimum integration load value from the settings stored in the minimum integration load setting and storing section 61 on the basis of the outputs from the work environment setting unit 44, the maximum loadage acquiring section 55, and the target carried load calculating section 56.

The minimum integration load value calculating section 57 according to the present embodiment calculates a minimum integration load value on the basis of at least one of the type of the carried stuff and the maximum loadage of the transportation machine, in addition to the magnitude of a target carried load that is the same as the target carried load according to the first embodiment.

Figure 12A:
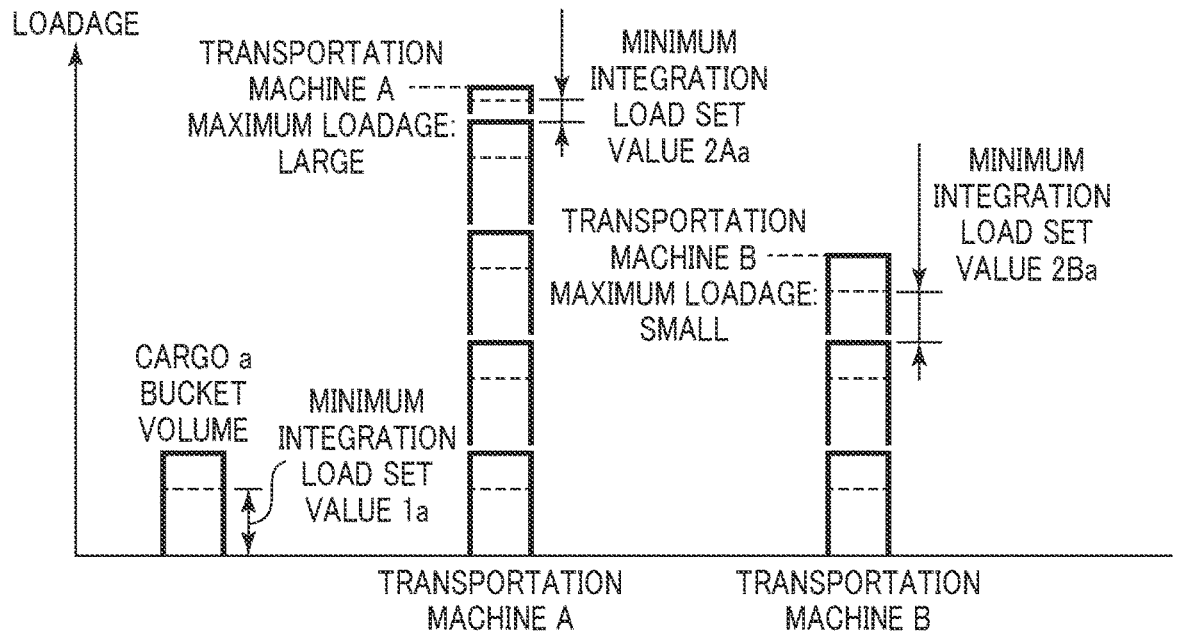
FIG. 12A is a graph illustrating a method in which the load measuring system according to the different embodiment of the present invention changes the magnitude of a minimum integration load value depending on maximum loadage of construction machines.

In FIG. 12A, it is assumed that carried stuff a of the same type is to be loaded on a transportation machine A and a transportation machine B that have different maximum loadage, and a case in which the minimum integration load value calculating section 57 calculates a minimum integration load value on the basis of the maximum loadage of the transportation machines will be described below. In the case of a loading work on the transportation machine A whose maximum loadage is larger, when carried stuff is carried successively four times with the bucket volume (see the bar on the left end of FIG. 12A), for example, the carried load in the final loading operation (the fifth loading operation) is much smaller than the other carried loads. Therefore, the magnitude of the set value of the minimum integration load value determined in step S120 illustrated in FIG. 8 needs to be set to a value smaller than the fifth carried load as indicated by a set value 2Aa in FIG. 12A. On the other hand, in the case of a loading work on the transportation machine B whose maximum loadage is smaller than the maximum loadage of the transportation machine A, even if carried stuff is carried successively twice with the bucket volume, for example, the carried load in the final loading operation (the third loading operation) is not essentially different from the other carried loads. Therefore, the magnitude of the set value of the minimum integration load value determined in step S120 illustrated in FIG. 8 needs to be set to a large value as indicated by a set value 2Ba in FIG. 12A. In such a case, the minimum integration load value calculating section 57 calculates a minimum integration load value on the basis of the maximum loadage of the transportation machine, thus the minimum integration load value can be optimized in loading works on the transportation machines with different maximum loadage, resulting in the same advantages as those according to the first embodiment.

Figure 12B:
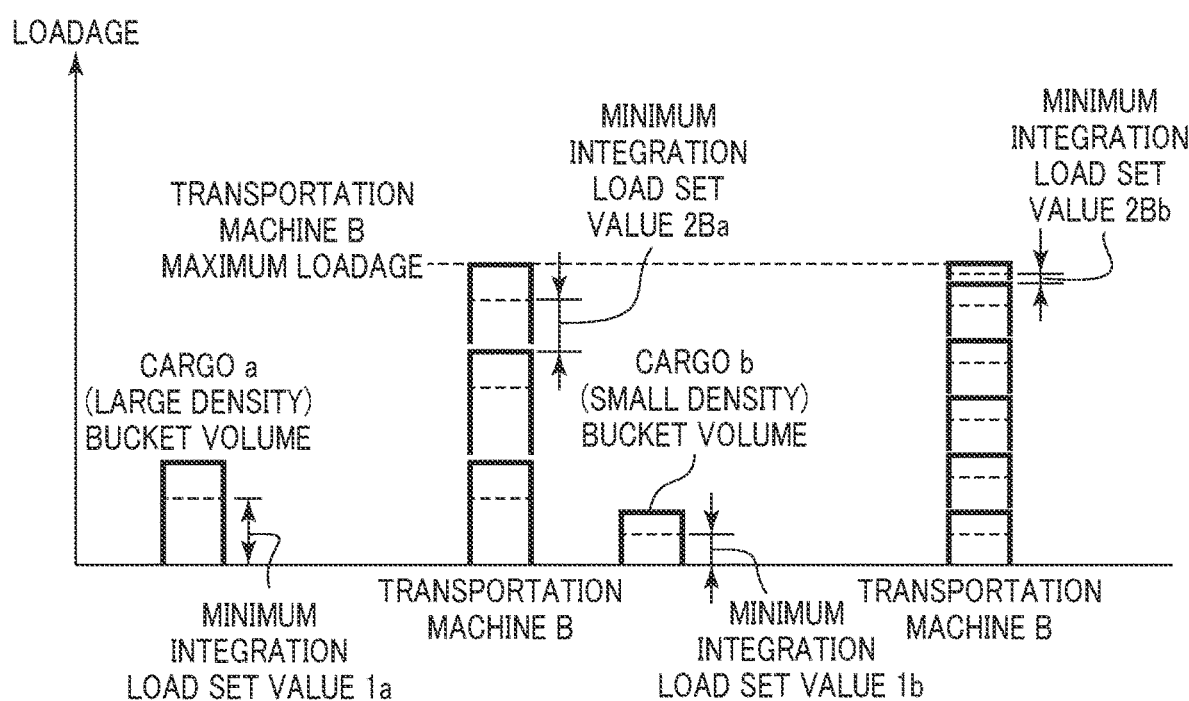
FIG. 12B is a graph illustrating a method in which the load measuring system according to the different embodiment of the present invention changes the magnitude of a minimum integration load value depending on the type of carried stuff.

In FIG. 12B, it is assumed that carried stuff a and b of different densities is to be loaded on transportation machines B that have the same maximum loadage, and a case in which the minimum integration load value calculating section 57 calculates a minimum integration load value on the basis of the types of the carried stuff will be described below. In the case of a loading work for loading the transportation machine B with the carried stuff a whose density is larger, a minimum integration load value determined in step S121 illustrated in FIG. 8 is calculated depending on the bucket volume Mbk for the carried stuff a. In case a target to be loaded is the carried stuff b whose density is smaller than the carried stuff a, the bucket volume Mbk is smaller than with the carried stuff a. Therefore, it is necessary to set a set value 1b of a minimum integration load value determined in step S121 illustrated in FIG. 8 to a value smaller than with the carried stuff a. In the case of a loading work for loading the transportation machine B with the carried stuff b, when carried stuff is carried successively five times with the bucket volume, for example, the carried load in the final loading operation (the sixth loading operation) is much smaller compared with the bucket volume. Therefore, the magnitude of a set value 2Bb of the minimum integration load value determined in step S120 illustrated in FIG. 8 needs to be set to a value smaller than the set value 1b. In such a case, the minimum integration load value calculating section 57 calculates a minimum integration load value on the basis of the type of the carried stuff (the density, the viscosity, or the like), thus the minimum integration load value can be optimized in loading works for loading carried stuff of different types, resulting in the same advantages as those according to the first embodiment.

Although not described repeatedly herein, the minimum integration load value calculating section 57 may be arranged to calculate a minimum integration load value on the basis of both the maximum loadage of the transportation machine and the type of the carried stuff.

Third Embodiment

A work machine according to a third embodiment of the present invention will be described below with reference to FIGS. 13 and 14. According to the present embodiment, loading cycles on a transportation machine are counted, and a minimum integration load value is changed depending on a target carried load value and a loading cycle count.

Figure 13:
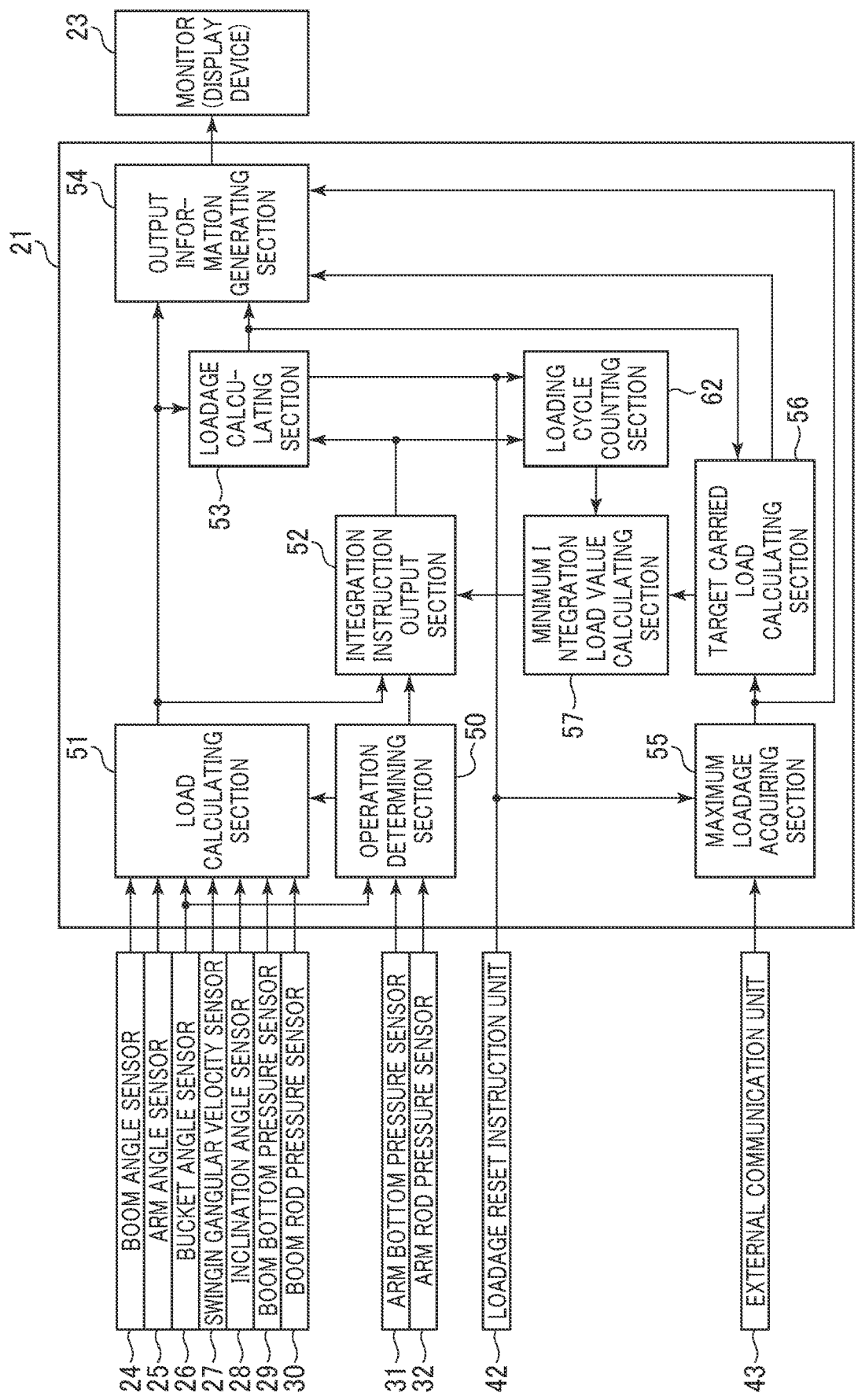
FIG. 13 is a schematic diagram illustrating the system configuration of a load measuring system according to a different embodiment of the present invention.

FIG. 13 is a schematic diagram illustrating the system configuration of a load measuring system that is incorporated in the work machine according to the present embodiment. A controller 21 illustrated in FIG. 13 includes a loading cycle counting section 62 for measuring a loading cycle count that represents the number of times that the integration instruction output section 52 outputs an integration instruction. The minimum integration load value calculating section 57 is arranged to change the magnitude of a minimum integration load at the time the integration instruction output section 52 determines an integration instruction, on the basis of the outputs from the target carried load calculating section 56 and the loading cycle counting section 62. More specifically, the minimum integration load value calculating section 57 calculates a first set value as a minimum integration load value when the magnitude of a target carried load is equal to or larger than a minimum integration load changing threshold value, and calculates as a minimum integration load value a second set value smaller than the first set value when the magnitude of a target carried load is smaller than the minimum integration load changing threshold value or when the loading cycle count from the loading cycle counting section 62 is equal to or larger than a predetermined threshold value (referred to as "loading cycle count threshold value").

Figure 14:
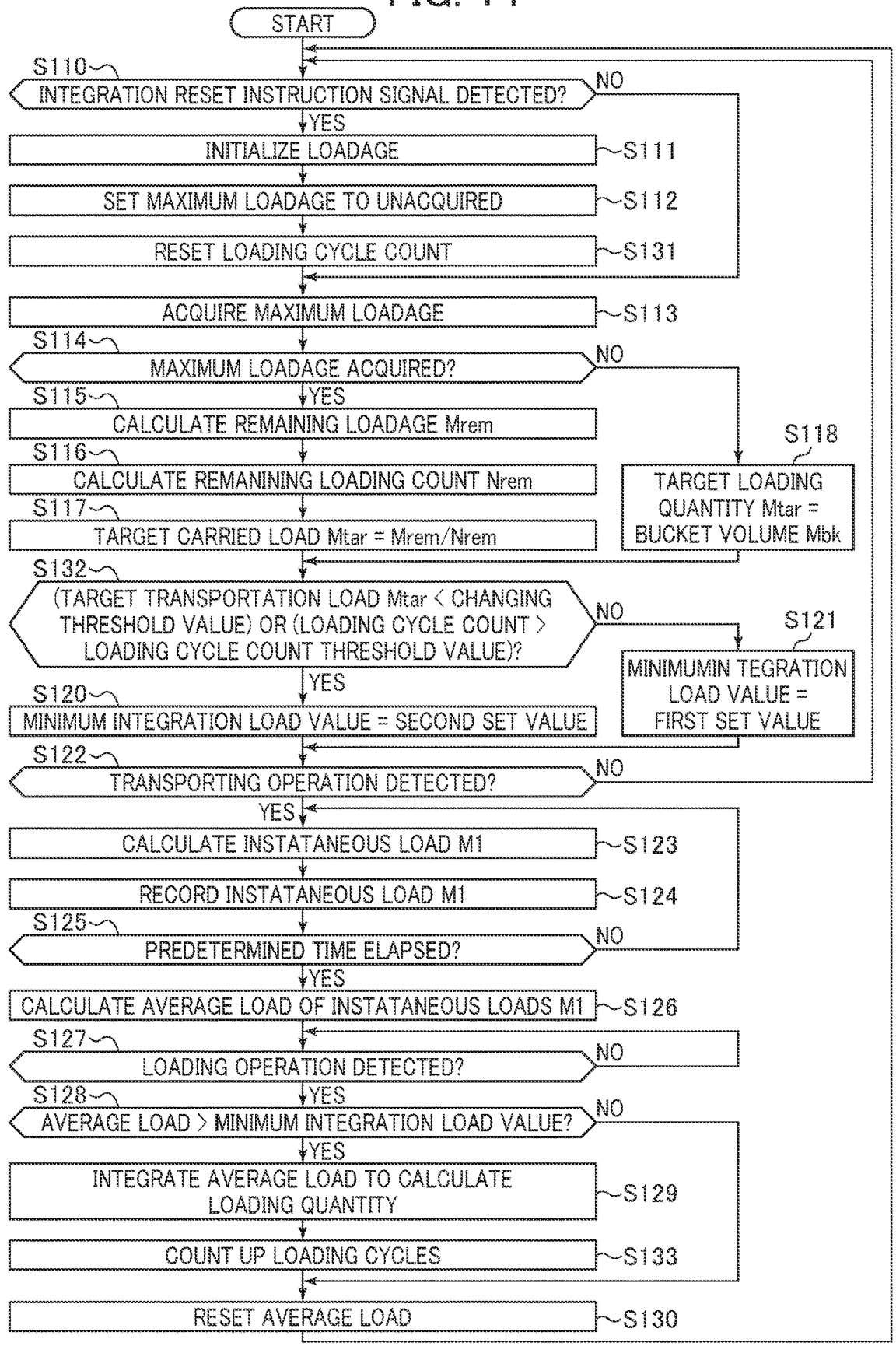
FIG. 14 is a flowchart illustrating a method in which the load measuring system according to the different embodiment of the present invention changes the magnitude of a minimum integration load value.

FIG. 14 is a flowchart illustrating a process of finalizing and integrating carried loads that is carried out by the controller 21 according to the third embodiment. Those steps that are identical to those of the previously described flowchart (FIG. 8) are denoted by identical reference characters, and their description may be omitted (this also holds true for subsequent flowcharts).

If a reset instruction signal for loadage from the loadage reset instruction unit 42 is sensed in step S110, then the loading cycle counting section 62 resets the loading cycle count held in the controller 21, in step S131.

In step S132 after step S117 or step S118, the minimum integration load value calculating section 57 determines whether the target carried load Mtar is smaller than the minimum integration load changing threshold value or the loading cycle count is larger than the loading cycle count threshold value determined in advance in the minimum integration load value calculating section 57. If either one of these two conditions is satisfied, then control goes to step S120 in which the minimum integration load value is set to the second set value. Otherwise, control goes to step S121 in which the minimum integration load value is set to the first set value. The loading cycle count threshold value may be set to an integer that is 1 smaller the minimum number of loading cycles required for the hydraulic excavator 1 to load the transportation machine 2. For example, if the loading work is finished in four loading cycles, for example, then loading cycle count threshold value is set to 3.

If the integration instruction output section 52 outputs an integration instruction in step S128, then the loading cycle counting section 62 counts up loading cycles held in the controller 21, in step S133 after step S129, thereby updating the loading cycle count.

According to the present embodiment, as described above, the minimum integration load value is changed by not only the magnitude of the target carried load, but also the loading cycle count. Thus, even in case maximum loadage cannot be acquired and a target carried load based on remaining loadage cannot be calculated, the minimum integration load value can be changed immediately before the adjustment cycle is carried out, thereby increasing the accuracy of the calculated value of loadage of the transportation machine 2.

Fourth Embodiment

A work machine according to a fourth embodiment of the present invention will be described below with reference to FIGS. 15 and 16. A load measuring system according to the present embodiment has a basic arrangement that is the same as the load measuring system illustrated in FIG. 3, but is characterized in that when an integration instruction is output from the integration instruction output section 52 after the minimum integration load value calculating section 57 has calculated a second set value as the minimum integration load value, the minimum integration load value calculating section 57 calculates a first set value as the minimum integration load value regardless of the magnitude of the target carried load.

Figure 15:
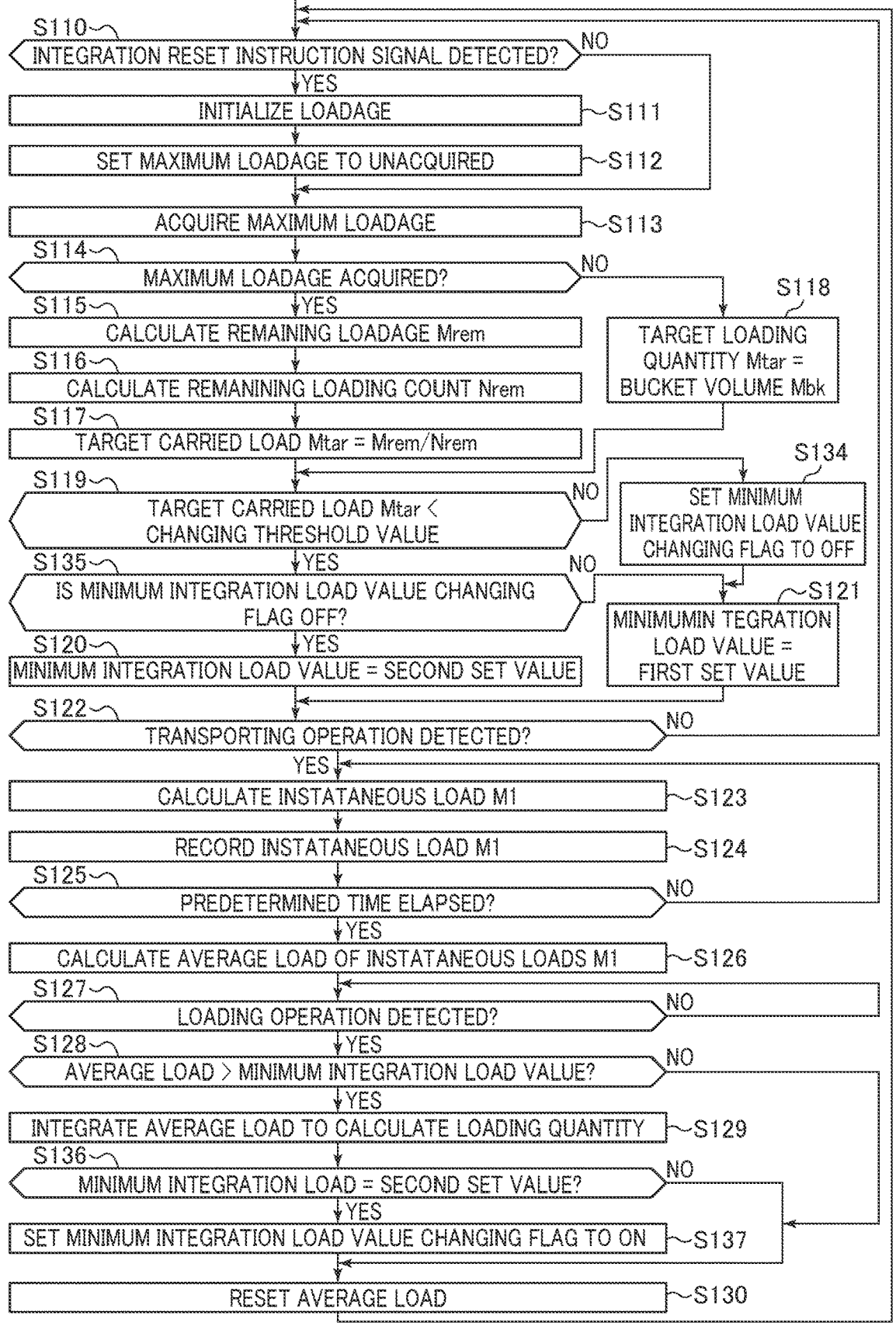
FIG. 15 is a flowchart of a method in which a load measuring system according to a different embodiment of the present invention changes the magnitude of a minimum integrated load.

FIG. 15 is a flowchart illustrating a process of finalizing and integrating carried loads that is carried out by the controller 21 according to the present embodiment. If the target carried load Mtar is equal to or larger than the minimum integration load changing threshold value in step S119 in FIG. 15, then a minimum integration load value changing flag held in the controller 21 is set to OFF in step S134. The minimum integration load value changing flag is a flag indicating whether there is an integration instruction after the minimum integration load value has been changed to the second set value or not. The minimum integration load value changing flag has an initial value of OFF, and is set to ON in case an integration instruction is output while the minimum integration load value is the second set value.

If the target carried load Mtar is smaller than the minimum integrated load changing threshold value in step S119, then the minimum integration load value calculating section 57 determines whether the minimum integration load value changing flag is OFF or not in step S135. If the minimum integration load value changing flag is OFF, then control goes to step S120. Otherwise (if the minimum integration load value changing flag is ON) then control goes to step S121 in which the minimum integration load value is set to the first set value.

If the integration instruction output section 52 outputs an integration instruction in step S128, then the minimum integration load value calculating section 57 determines whether the minimum integration load value is the second set value or not in step S136 after step S129. If the minimum integration load value is the second set value, then the minimum integration load value changing flag is set to ON in step S137, after which control goes to step S130. If the minimum integration load value is not the second set value, then control goes to step S130 without changing the minimum integration load value changing flag.

—Operation•Advantages—

Operation and advantages of the hydraulic excavator according to present embodiment will be described below with reference to FIG. 16. As with FIG. 9, FIG. 16 is a graph illustrating an example of changes in loadage Mt, a target carried load Mtar, a carried load, and a minimum integration load value according to the present embodiment. In the example illustrated in FIG. 16, after a carried load has been measured during a ground leveling work, the loadage reset instruction unit 42 is operated, thereby outputting a reset instruction signal.

Figure 16:
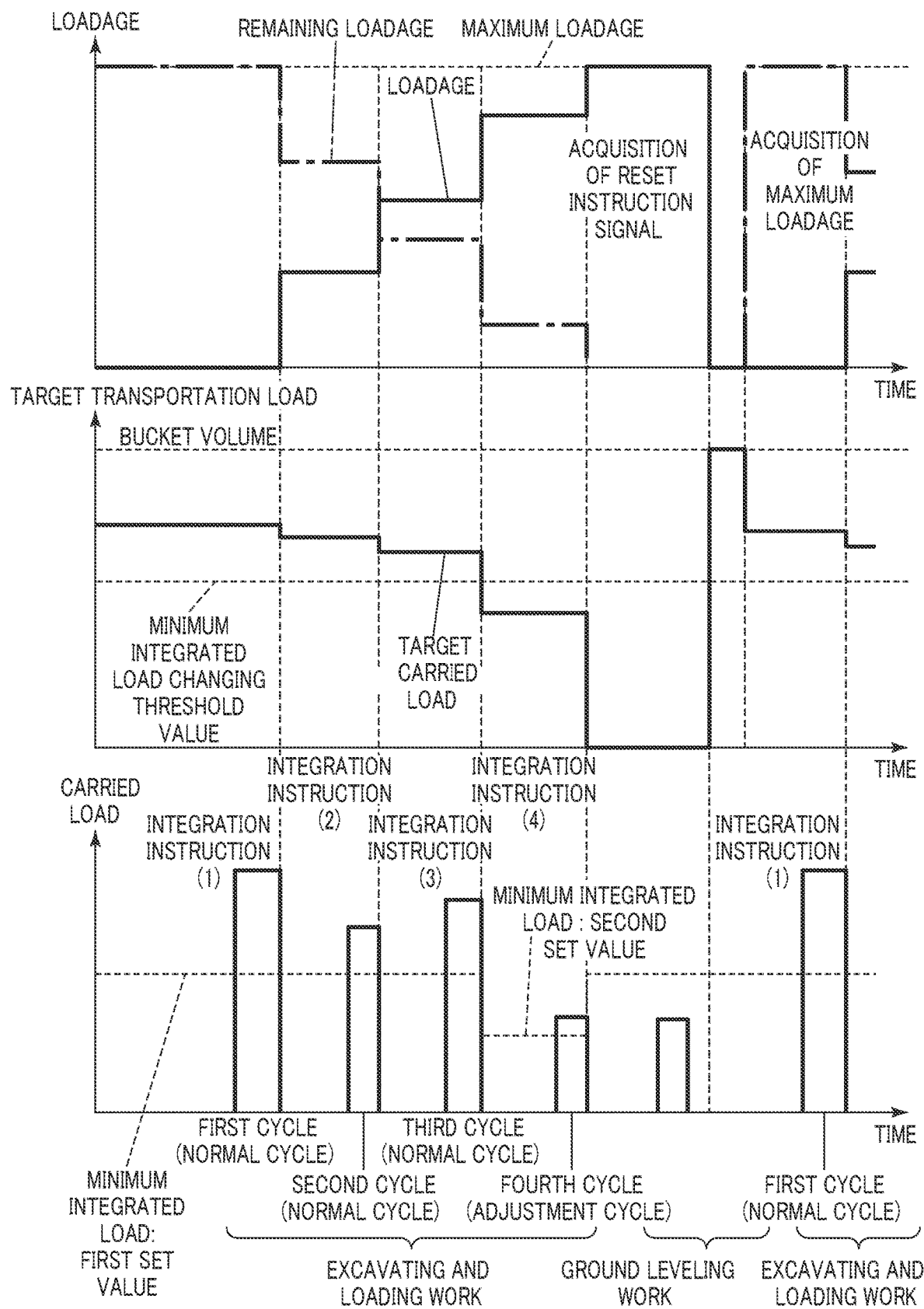
FIG. 16 is a graph illustrating the method in which the load measuring system according to the different embodiment of the present invention changes the magnitude of the minimum integration load value.

When an integration up to the third cycle on the hydraulic excavator 1 arranged as described above is completed, steps S119, S135, and S120 are carried out before a carrying operation is performed in the fourth cycle, setting the minimum integration load value to the second set value while the minimum integration load value changing flag is OFF (the lower portion of FIG. 16). Thereafter, when the carrying operation and a loading operation in the fourth cycle are performed, steps S136 and S137 are carried out, changing the minimum integration load value changing flag from OFF to ON.

Thereafter, control goes back to step S110 and the sequence is executed up to the process of calculating a target carried load in step S117, after which step S119 is carried out. Since the target carried load is less than the minimum integration load changing threshold value in step S119, control goes to step S135. In step S135, the minimum integration load value calculating section 57 determines the minimum integration load value changing flag. At this time, since the minimum integration load value changing flag has been set to ON in step S137 in the fourth cycle, even though the target carried load is less than the minimum integration load changing threshold value, control goes to step S121 in which the minimum integration load value is changed from the second set value to the first set value (the lower portion of FIG. 16). Even if the target carried load is equal to or larger than the minimum integration load changing threshold value in step S119, control goes from step S119 to step S134 and the minimum integration load value is changed to the first set value. Therefore, the result remains the same. In other words, the minimum integration load value is necessarily set to the first set value regardless of the magnitude of the target carried value. Consequently, as illustrated in the lower portion of FIG. 16, even if a carried load is measured in a ground level work performed before the loadage reset instruction unit 42 is operated after the fourth cycle has been finished, the carried load is not integrated as it is less than the first set value.

Thereafter, in the example illustrated in FIG. 16, after the ground leveling work has been completed, the operator operates the loadage reset instruction unit 42, and an integration reset instruction signal is sensed in step S110, with the remaining loadage increasing to the maximum loadage (the upper portion of FIG. 16). In step S117, a target carried load equal to or larger than the minimum integration load changing threshold value is calculated (the middle portion of FIG. 16), after which control goes from step S119 to step S134 in which the minimum integration load value changing flag is changed from ON back to OFF.

According to the present embodiment, as described above, when an integration instruction is output from the integration instruction output section 52 after the minimum integration load value calculating section 57 has calculated a second set value as the minimum integration load value, the minimum integration load value calculating section 57 calculates a first set value as the minimum integration load value regardless of the magnitude of the target carried load. Consequently, even in case the outputting of a reset integration signal from the loadage reset instruction unit 42 is delayed, an operation-analogous non-loading work can be distinguished accurately and a carried load therein can be excluded from an integration target, thus the accuracy of the calculated value Mt of loadage of the transportation machine 2 is increased.

Fifth Embodiment

A work machine according to a fifth embodiment of the present invention will be described below with reference to FIGS. 17 through 19. The present embodiment is characterized in that a work status of the front work implement 12 is determined on the basis of a minimum carried load value and an integration instruction, and the work status is output to an indicating device such as the monitor 23 or the like, which notifies the operator, administrator, or the like of the work status.

Figure 17:
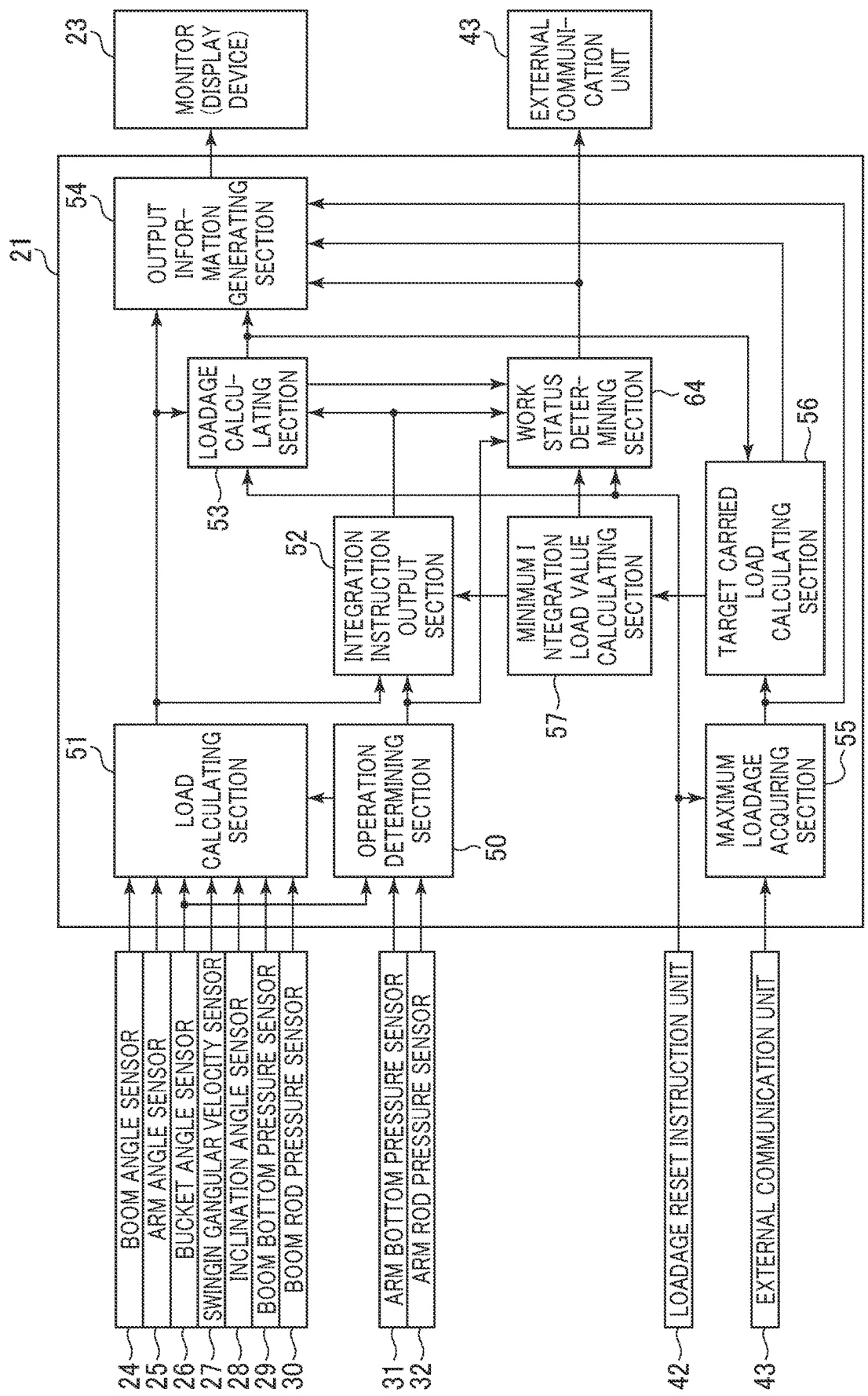
FIG. 17 is a schematic diagram illustrating the system configuration of a load measuring system according to a different embodiment of the present invention.

FIG. 17 is a schematic diagram illustrating the system configuration of a load measuring system that is incorporated in the work machine according to the present embodiment. A controller 21 illustrated in FIG. 17 includes a work status determining section 64 for determining a work status of the front work implement 12 on the basis of whether a second set value has been calculated by the minimum integration load value calculating section 57 or not and whether an integration instruction has been output from the integration instruction output section 52 or not. The work status determining section 64 determines a work status on the basis of the outputs from the loadage reset instruction unit 42, the operation determining section 50, the integration instruction output section 52, the loadage calculating section 53, and the minimum integration load value calculating section 57, and outputs the determined work status to the output information generating section 54 and the external communication unit 43.

Figure 18:
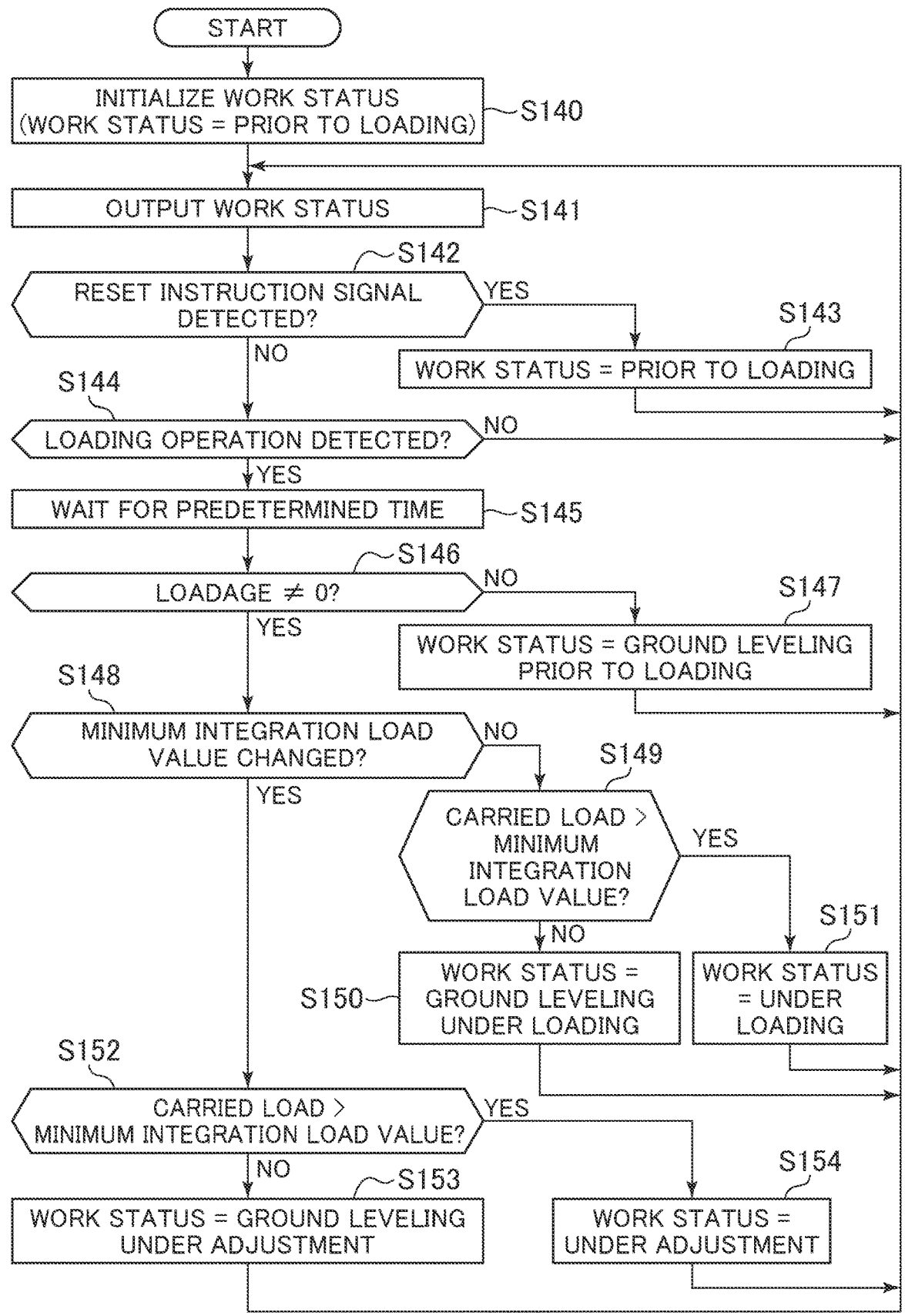
FIG. 18 is a flowchart of a method in which the load measuring system according to the different embodiment of the present invention determines a work status.
Figure 19:
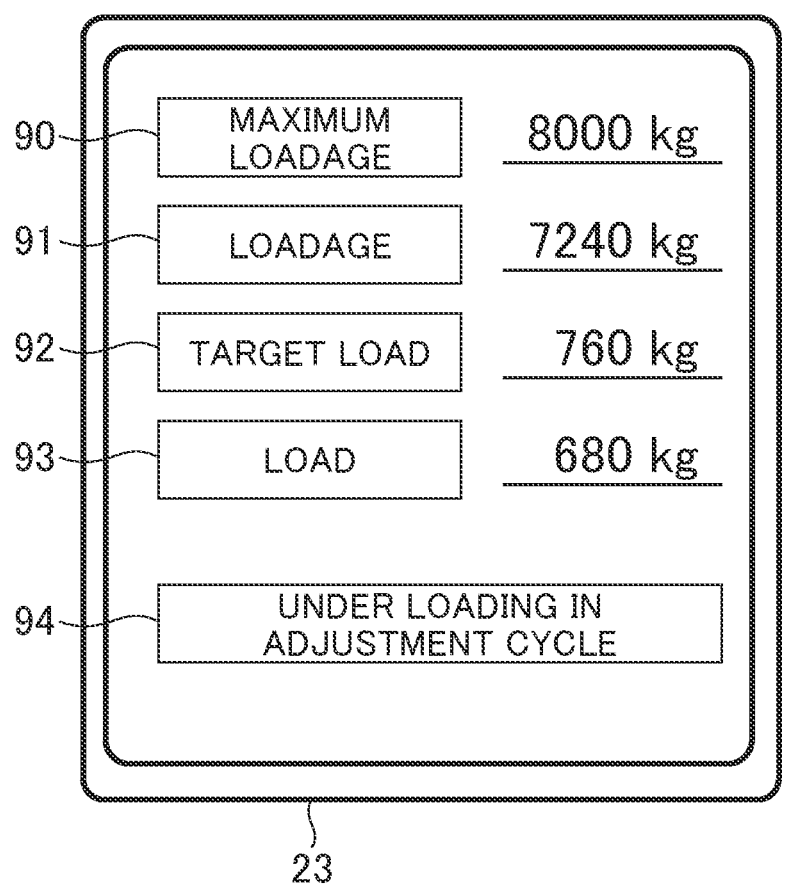
FIG. 19 is a view illustrating an output screen of a monitor of the load measuring system according to the different embodiment of the present invention.

FIG. 18 is a flowchart of a process that the controller 21 according to the present embodiment performs in the work status determining section 64. Each of the steps illustrated in FIG. 18 is executed in every predetermined sampling period by the controller 21. A case in which the work status determining section 64 outputs the determined work status to the output information generating section 54 (to the monitor 23) will be described hereinafter. The determined result from the work status determining section 64 may be output via the external communication unit 43 to a terminal such as an external computer or the like, so that the determined result IS appropriately referred to.

First, the work status determining section 64 initializes the work status in step S140. Specifically, the work status is set to "PRIOR TO LOADING" indicating a status before carried stuff is loaded on the transportation machine 2 as a loading target (i.e., indicating that a loading operation in the first cycle has not been performed and loadage of the transportation machine 2 is zero), and held in a storage device in the controller 21. In step S141, the work status determining section 64 outputs the work status that is held in the storage device to the monitor 23. FIG. 19 is a view illustrating an output screen of the monitor 23 according to the present embodiment. The output screen of the monitor 23 includes a work status display area 94. In case a work status is held prior to loading, the work status display area 94 displays a message "PRIOR TO LOADING WORK." In FIG. 19, the work status display area 94 displays a message in case the work status represents "UNDER ADJUSTMENT" (in step S154).

In step S142, the work status determining section 64 monitors whether an integration reset instruction signal has been output from the loadage reset instruction unit 42 or not. If it is determined that an integration reset instruction signal has been output, then control goes to step S143 in which the work status is set to "PRIOR TO LOADING" and held in the controller 21, after which control returns to step S141. In this case, the work status of "PRIOR TO LOADING" is displayed on the monitor 23 in step S141.

If it is determined that an integration reset instruction signal has not been output in step S142, then the work status determining section 64 monitors whether a loading operation determination has been input from the operation determining section 50 or not. If it is determined that a loading operation determination has not been input, then control goes back to step S141 in which the work status held at this time is output to the monitor 23.

On the other hand, if it is determined that a loading operation determination has been input in step S144 (i.e., if step S128 is executed in the flowchart illustrated in FIG. 8), then the work status determining section 64 waits in step S145 until the execution of step S120 or S121 in the flowchart illustrated in FIG. 8 is completed, after which control goes to step S146. In FIG. 18, the time during which the work status determining section 64 waits after the execution of step S128 in FIG. 8 until step S120 or S121 is completed is referred to as "PREDETERMINED TIME."

In step S146, the work status determining section 64 determines whether the loadage output from the loadage calculating section 53 is 0 or not. If the loadage is not 0, then control goes to step S148. If the loadage is 0, then the work status determining section 64 sets in step S147 the work status to "GROUND LEVELING PRIOR TO LOADING" indicating that though an operation-analogous non-loading work is carried out, the carried load is not integrated, and holds the set work status in the controller 21, after which control goes back to step S141. In this case, a message indicating that the work status represents ground leveling prior to loading ("UNDER GROUND LEVELING PRIOR TO LOADING," for example) is displayed on the monitor 23 in step S141.

When control goes to step S148, the work status determining section 64 determines whether the minimum integration load value calculating section 57 has changed the minimum integration load value from the first set value to the second set value or not. If the minimum integration load value has been changed (i.e., has changed to the second set value) then control goes to step S152. If the minimum integration load value has not been changed (i.e., has remained to be the first set value) then control goes to step S149.

In step S149, the work status determining section 64 determines whether an integration instruction has been output from the integration instruction output section 52 or not by determining whether the carried load is larger than the first set value (the minimum integration load value) or not. If it is determined that an integration instruction has not been output, then control goes to step S150 in which the work status determining section 64 sets the work status to "GROUND LEVELING UNDER LOADING" indicating that though an operation-analogous non-loading work is carried out, the carried load is not integrated during normal cycles of the loading work, and holds the set work status in the controller 21, after which control goes back to step S141. In this case, a message indicating that the work status represents ground leveling under loading ("GROUND LEVELING IN NORMAL CYCLE") is displayed on the monitor 23 in step S141.

If it is determined that an integration instruction has been output in step S149, then control goes to step S151. In step S151, the work status determining section 64 sets the work status to "UNDER LOADING" indicating that a loading operation is carried out in normal cycles of the loading work, and holds the set work status in the controller 21, after which control goes back to step S141. In this case, a message indicating that the work status represents under loading ("UNDER LOADING IN NORMAL CYCLE," for example) is displayed on the monitor 23 in step S141.

If it is determined that the minimum integration load has been changed to the second set value in FIG. 148 and control goes to step S152, then the work status determining section 64 determines whether the carried load is larger than the second set value (the minimum carried load value) or not, thereby determining whether an integration instruction has been output from the integration instruction output section 52 or not, in step S152. If it is determined that an integration instruction has not been output, the work status determining section 64 sets in step S153 the work status to "GROUND LEVELING UNDER ADJUSTMENT" indicating that though an operation-analogous non-loading work is carried out in the adjustment cycle of the loading work, the carried load is not integrated, and holds the set work status in the controller 21, after which control goes back to step S141. In this case, a message indicating that the work status represents ground leveling under adjustment ("GROUND LEVELING IN ADJUSTMENT CYCLE," for example) is displayed on the monitor 23 in step S141.

If it is determined that an integration instruction has been output in step S152, then control goes to step S154. In step S154, the work status determining section 64 sets the work status to "UNDER ADJUSTMENT" indicating that a loading operation is carried out in the adjustment cycle of the loading work, and holds the set work status in the controller 21, after which control goes back to step S141. In this case, a message indicating that the work status represents under adjustment ("UNDER LOADING IN ADJUSTMENT CYCLE," for example) is displayed on the monitor 23 in step S141.

By thus indicating the work status to the operator, the operator recognizes adjustment of the carried load particularly when a character string "ADJUSTMENT CYCLE" is displayed on the monitor 23, making it possible to optimize loadage of the transportation machine 2. Furthermore, since the operator can confirm whether there is a discrepancy between the content of the message on the monitor 23 and the integration of the carried load, the operator can grasp that the accuracy of the calculated value of loadage of the transportation machine 2 is high in the absence of such a discrepancy. In addition, if the work status output from the work status determining section 64 is output via the external communication unit 43 to an external computer for indicating the work status to the administrator, the administrator can grasp the degree to which a work other than the loading work is being carried out at the site where the hydraulic excavator 1 is operating. Therefore, the work can be planned efficiently.

Sixth Embodiment

A work machine according to a sixth embodiment of the present invention will be described below with reference to FIGS. 20 through 22. The present embodiment is characterized in that the second set value is changed on the basis of a variation of the carried load calculated after the second set value has been calculated by the minimum integration load value calculating section 57.

Figure 20:
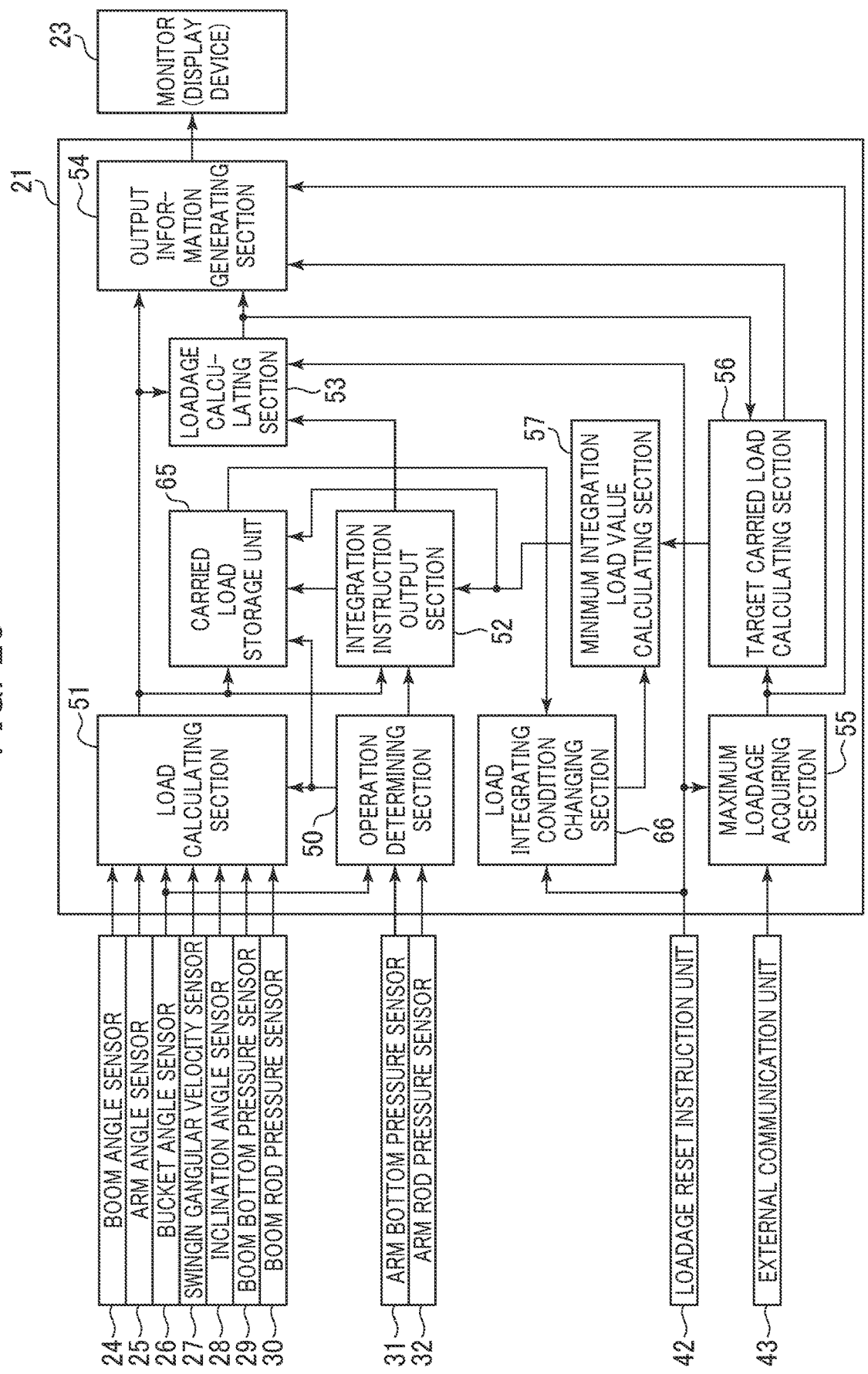
FIG. 20 is a schematic diagram illustrating the system configuration of a load measuring system according to a different embodiment of the present invention.

FIG. 20 is a schematic diagram illustrating the system configuration of a load measuring system that is incorporated in the work machine according to the present embodiment. A controller 21 illustrated in FIG. 20 includes a carried load storage section 65 for storing carried loads calculated by the load calculating section 51 and a load integrating condition changing section 66 for changing the second set value on the basis of a variation of the carried load calculated after the second set value has been calculated by the minimum integration load value calculating section 57. The carried load storage section 65 stores a plurality of carried loads on the basis of the outputs from the operation determining section 50, the load calculating section 51, the integration instruction output section 52, and the minimum integration load value calculating section 57. The load integrating condition changing section 66 changes the second set value on the basis of the outputs from the loadage reset instruction unit 42 and the carried load storage section 65, and the like.

Figure 21:
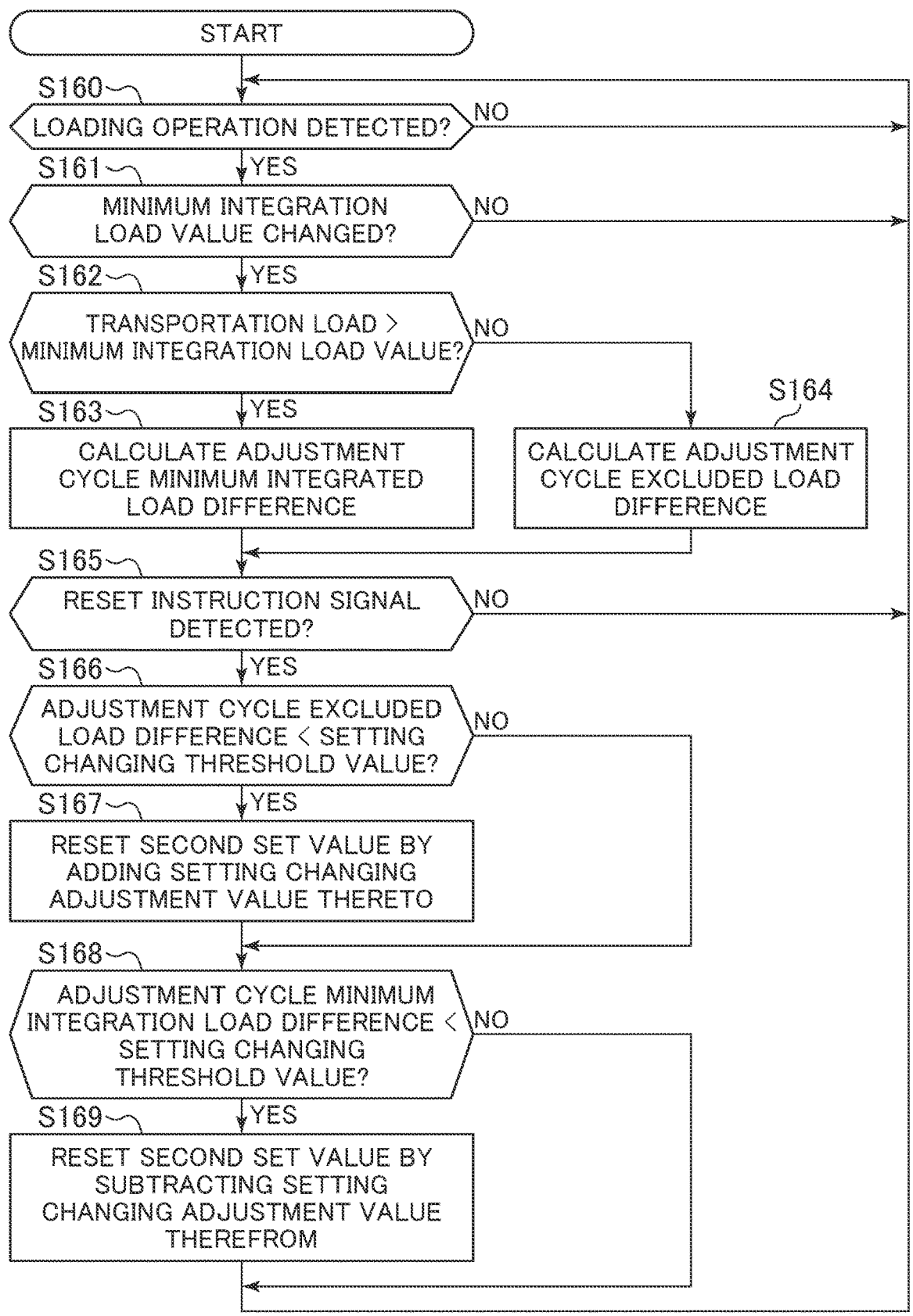
FIG. 21 is a flowchart of a method in which the load measuring system according to the different embodiment of the present invention changes settings about changing the magnitude of a minimum integration load value.

FIG. 21 is a flowchart of a process that the controller 21 according to the present embodiment performs in the carried load storage section 65 and the load integrating condition changing section 66. Each of the steps illustrated in FIG. 21 is executed in every predetermined sampling period by the controller 21. As described with reference to FIGS. 17 and 18, a work cycle in a loading work after the minimum integration load value has been changed from the first set value to the second set value (normally a final cycle) will hereinafter be referred to as an adjustment cycle.

In step S162, the carried load storage section 65 monitors whether the operation determining section 50 has output a carrying operation determination or not. In case a carrying operation determination is not sensed, control goes back to step S120 to continue monitoring. In case a carrying operation determination is sensed, control goes to step S161 to determine whether the minimum integration load value calculating section 57 has changed the minimum integration load value from the first set value to the second set value or not. If the minimum integration load value has not been changed to the second set value, then control goes to step S160. If the minimum integration load value has been changed to the second set value, then control goes to step S162.

In step S162, the carried load storage section 65 determines whether the carried load is larger than the second set value (the minimum integration load value) or not, thereby sensing whether an integration instruction has been output from the integration instruction output section 52 or not. If an integration instruction has been output, then control goes to step S163. Otherwise, control goes to step S164.

In step S163, the carried load storage section 65 calculates and holds an average and standard deviation of the carried load integrated in the adjustment cycle as indicated by the right bar in FIG. 22. Then, the carried load storage section 65 calculates an adjustment cycle minimum integrated load difference that represents the difference between the standard deviation of the integrated carried load with respect to the average of the integrated carried load and the second set value (the minimum integration load value), after which control goes to step S165.

In step S164, the carried load storage section 65 calculates and holds an average and standard deviation of the carried load excluded from an integration in the adjustment cycle as indicated by the left bar in FIG. 22. Then, the carried load storage section 65 calculates an adjustment cycle excluded load difference that represents the difference between the standard deviation of the carried load excluded from the integration with respect to the average of the carried load excluded from the integration and the second set value (the minimum integration load value), after which control goes to step S165.

In step S165, the load integrating condition changing section 66 monitors whether the loadage reset instruction unit 42 has output a reset instruction signal for loadage or not. If a reset instruction signal is not output, then control goes back to step S160. If a reset instruction signal is output, then control goes to step S166.

In step S166, the load integrating condition changing section 66 determines whether the adjustment cycle excluded load difference in step S164 is smaller than a predetermined threshold value set in the load integrating condition changing section 66 (hereinafter referred to as "setting changing threshold value") or not. If the adjustment cycle excluded load difference is larger than the predetermined threshold value, then control jumps to step S168.

If the adjustment cycle excluded load difference is smaller than the setting changing threshold value, then the load integrating condition changing section 66 adds a predetermined adjustment value set in the load integrating condition changing section 66 (hereinafter referred to as "setting changing adjustment value") to the second set value in step S167, after which control goes to step S168. For example, in case the second set value is too small in the adjustment cycle, the transportation machine 2 may be judged as being loaded despite the fact that no loading is performed on the transportation machine 2, possibly giving rise to a cycle in which to integrate the carried load. However, such a cycle in which to integrate the carried load in error can be eliminated by increasing the second set value by adding the setting changing adjustment value thereto.

In step S168, the load integrating condition changing section 66 determines whether the adjustment cycle minimum integrated load difference in step S163 is smaller than the setting changing threshold value set in the load integrating condition changing section 66 or not. If the adjustment cycle minimum integrated load difference is larger than the setting changing threshold value, then control goes back to step S160.

If the adjustment cycle minimum integrated load difference is smaller than the setting changing threshold value, then the load integrating condition changing section 66 subtracts the setting changing adjustment value set in the load integrating condition changing section 66 from the second set value in step S169 as indicated by the right bar in FIG. 22, after which control goes back to step S160. For example, in case the second set value is too large in the adjustment cycle, the transportation machine 2 may be judged as being not loaded despite the fact that loading is performed on the transportation machine 2, possibly giving rise to a cycle in which not to integrate the carried load. However, such a cycle in which not to integrate the carried load that needs to be integrated can be eliminated by reducing the second set value by subtracting the setting changing adjustment value therefrom.

The target to be changed according to the present embodiment is not limited to the minimum integration load value in the adjustment cycle, i.e., the second set value. Rather, according to a method similar to the method described with reference to FIGS. 20 through 22, the first set value as the minimum integration load value in the normal cycles or the minimum integration load changing threshold value as a trigger for changing the minimum integration load value from the first set value to the second set value may obviously be used as the target to be changed.

By thus setting the minimum integration load value on the basis of the history of carried loads, a criterion for determining an integration instruction based on the reality of the work can appropriately be established, thereby increasing the accuracy of the calculated value of loadage of the transportation machine 2.

Others

The present invention is not limited to the embodiments described above, but may cover various changes and modifications as falling within the scope thereof. For example, the present invention is not limited to arrangements including all the components described in the above embodiments, but may cover arrangements from which some of the components have been deleted. Furthermore, some of the components according to some embodiments may be added to or substituted for components according to other embodiments.

For example, the hydraulic excavator 1 used in the description of the above embodiments has the upper swing structure 11, the boom 13, the arm 14, and the bucket 15. However, the work machine is not limited to such structural details, but may be of different forms such as a lifting magnet machine, for example.

The way in which the operation determining section 50 determines operations is not limited to the above method using the arm cylinder bottom pressure and the bucket angle. If the work machine is a lifting magnet machine, for example, then it is easy to determine a carrying operation and a loading operation on the basis of ON/OFF signals for magnet attraction.

The process of resetting loadage is not limited to the above method using the loadage reset instruction unit 42. For example, positional information of the transportation machine 2 may be acquired via the external communication unit 43, and the transportation machine 2 may reset loadage when it is spaced from the hydraulic excavator 1 by a predetermined distance.

The calculation of a carried load is not limited to the equations based on the model illustrated in FIG. 7, but may be performed using different equations. For example, a load may be calculated using equations of motion of the front mechanism 12 including the boom 13, the arm 14, and the bucket 15.

The components of the controller (controller) 21, the functions of the components, processes to be executed thereby, and the like may be partly or wholly implemented by hardware (for example, logics for performing the functions may be designed by integrated circuits, and the like). The components of the controller 21 may be implemented by programs (software) that can realize the functions of the components of the controller 21 when read and executed by a processing device (a CPU), for example. Information of the programs may be stored in a semiconductor memory (a flash memory, an SSD, or the like), a magnetic storage device (a hard disk drive or the like), a recording medium (a magnetic disk, an optical disk, or the like), or the like.

In the above description of the embodiments, there have been illustrated control lines and information lines that are understood as being required for the description of the embodiments. However, not all control lines and information lines of products are necessarily illustrated. Actually, almost all of the components may be considered as being connected to each other.

DESCRIPTION OF REFERENCE CHARACTERS

1: Hydraulic excavator
2: Transportation machine (dump truck)
12: Front work implement (work implement)
16, 17, 18: Hydraulic cylinder (actuator)
21: Controller (controller)
23: Monitor (display device)
50: Operation determining section
51: Load calculating section
52: Integration instruction output section
53: Loadage calculating section
56: Target carried load calculating section
57: Minimum integration load value calculating section,
62: Loading cycle counting section
64: Work status determining section
65: Carried load storage section
66: Load integrating condition changing section

The invention claimed is:
1. A work machine comprising:
a work implement;
an actuator for actuating the work implement;
a controller for determining an operation of the work implement on a basis of at least one of posture information of the work implement and load information of the actuator, calculating a carried load representing a load value of carried stuff carried by the work implement in case it is determined that the work implement has performed a carrying operation for a transportation machine, and integrating the carried load to calculate loadage of the transportation machine; and
a display device for displaying the loadage, wherein the controller
calculates a target carried load representing a target value for the carried load per bucket to be carried in a next carrying operation in case the loadage is changed, on a basis of the loadage,
calculates a minimum integration load value for determining that the work implement has performed a loading operation depending on magnitude of the target carried load, and
calculates the loadage by integrating the carried load in case it is determined that the work implement has performed a loading operation on the transportation machine on a basis of a posture of the work implement and in case the carried load is equal to or larger than the minimum integration load value.

2. The work machine according to claim 1, wherein the controller calculates a first set value as the minimum integration load value in case the magnitude of the target carried load is equal to or larger than a predetermined threshold value and calculates a second set value smaller than the first set value as the minimum integration load value in case the magnitude of the target carried load is smaller than the predetermined threshold value.

3. The work machine according to claim 1, wherein the controller measures a loading cycle count that represents the number of times that the integration instruction output section outputs the integration instruction, and the controller calculates a first set value as the minimum integration load value in case the magnitude of the target carried load is equal to or larger than a predetermined threshold value and calculates a second set value smaller than the first set value as the minimum integration load value in case the magnitude of the target carried load is smaller than the predetermined threshold value or in case the loading cycle count is equal to or larger than a predetermined threshold value.

4. The work machine according to claim 1, wherein the controller calculates a first set value as the minimum integration load value in case the magnitude of the target carried load is equal to or larger than a predetermined threshold value, calculates a second set value smaller than the first set value as the minimum integration load value in case the magnitude of the target carried load is smaller than the predetermined threshold value, and after having calculated the second set value, calculates the first set value as the minimum integration load value regardless of the magnitude of the target carried load in case it is determined that the work implement has performed a carrying operation for the transportation machine and in case the carried load is equal to or larger than the minimum integration load value.

5. The work machine according to claim 1, wherein the controller outputs an integration instruction in case it is determined that the work implement has performed a carrying operation for the transportation machine and in case the carried load is equal to or larger than the minimum integration load value, the controller calculates a first set value as the minimum integration load value in case the magnitude of the target carried load is equal to or larger than a predetermined threshold value and calculates a second set value smaller than the first set value as the minimum integration load value in case the magnitude of the target carried load is smaller than the predetermined threshold value, the controller determines a work status of the work implement on a basis of whether the second set value has been calculated or not and whether the integration instruction has been output or not, and the display device displays the determined work status.

6. The work machine according to claim 5, wherein the controller determines that a loading operation in an adjustment cycle has been carried out in case the second set value is calculated and in case the integration instruction is output, determines that an operation-analogous non-loading work has been carried out in the adjustment cycle in case the second set value is calculated and in case the integration instruction is not output, determines that a loading operation in a normal cycle has been carried out in case the second set value is not calculated and in case the integration instruction is output, and determines that an operation-analogous non-loading work has been carried out in the normal cycle in case the second set value is not calculated and in case the integration instruction is not output.

7. The work machine according to claim 1, wherein the controller calculates a first set value as the minimum integration load value in case the magnitude of the target carried load is equal to or larger than a predetermined threshold value, and calculates a second set value smaller than the first set value as the minimum integration load value in case the magnitude of the target carried load is smaller than the predetermined threshold value, and the controller changes at least one of the predetermined threshold value and the second set value on a basis of a variation of the carried load calculated after the second set value has been calculated.

8. The work machine according to claim 1, wherein the controller calculates the minimum integration load value on the basis of the magnitude of the target carried load and at least one of the type of the carried stuff and maximum loadage of the transportation machine.

* * * * *